(12) United States Patent
Toothaker et al.

(10) Patent No.: US 11,691,279 B2
(45) Date of Patent: Jul. 4, 2023

(54) SYSTEMS AND METHODS FOR MAINTAINING VACUUM HOSE LIFE IN HOSE ROUTING SYSTEMS IN PROGRAMMABLE MOTION SYSTEMS

(71) Applicant: Berkshire Grey Operating Company, Inc., Bedford, MA (US)

(72) Inventors: Calvin Toothaker, Medford, MA (US); John Richard Amend, Jr., Belmont, MA (US); Benjamin Cohen, Somerville, MA (US); Christopher Geyer, Arlington, MA (US); Matthew T. Mason, Pittsburgh, PA (US); Thomas Wagner, Concord, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 280 days.

(21) Appl. No.: 16/855,015

(22) Filed: Apr. 22, 2020

(65) Prior Publication Data

US 2020/0338728 A1  Oct. 29, 2020

Related U.S. Application Data

(60) Provisional application No. 62/838,747, filed on Apr. 25, 2019.

(51) Int. Cl.
 *B25J 9/16* (2006.01)
 *B25J 15/06* (2006.01)
 *B25J 18/00* (2006.01)

(52) U.S. Cl.
 CPC ......... *B25J 9/1633* (2013.01); *B25J 15/0616* (2013.01); *B25J 18/00* (2013.01)

(58) Field of Classification Search
 CPC ....... B25J 9/1633; B25J 15/0616; B25J 18/00
 See application file for complete search history.

(56) References Cited

U.S. PATENT DOCUMENTS

| | | | |
|---|---|---|---|
| 5,727,832 A | | 3/1998 | Holter |
| 6,131,973 A | * | 10/2000 | Trudeau ............... B65G 47/917 294/186 |

(Continued)

FOREIGN PATENT DOCUMENTS

| | | |
|---|---|---|
| CA | 2514204 A1 | 8/2004 |
| CA | 2928645 A1 | 4/2015 |

(Continued)

OTHER PUBLICATIONS

Notification Concerning Transmittal of International Preliminary Report on Patentability and the International Preliminary Report on Patentability issued by the International Bureau of WIPO in related International Application No. PCT/US202/029200 dated Nov. 4, 2021, 8 pages.

(Continued)

*Primary Examiner* — Khoi H Tran
*Assistant Examiner* — Tristan J Greiner
(74) *Attorney, Agent, or Firm* — Gesmer Updegrove LLP

(57) ABSTRACT

A programmable motion robotic system is disclosed that includes a plurality of arm sections that are joined one to another at a plurality of joints to form an articulated arm, and a hose coupling an end effector of the programmable motion robotic system to a vacuum source. The hose is attached to at least one arm section of the articulated arm by a pass-through coupling that permits the hose to pass freely through the coupling as the plurality of arm sections are moved about the plurality of joints.

32 Claims, 24 Drawing Sheets

(56) References Cited

U.S. PATENT DOCUMENTS

| | | | |
|---|---|---|---|
| 6,181,983 B1* | 1/2001 | Schlemmer | B25J 9/1689 700/262 |
| 9,415,975 B2 | 8/2016 | Lundin | |
| 9,687,982 B1 | 6/2017 | Jules et al. | |
| 10,007,827 B2 | 6/2018 | Wagner et al. | |
| 10,335,956 B2 | 7/2019 | Wagner et al. | |
| 10,369,701 B1 | 8/2019 | Diankov et al. | |
| 10,438,034 B2 | 10/2019 | Wagner et al. | |
| 10,538,394 B2 | 1/2020 | Wagner et al. | |
| 10,576,621 B2 | 3/2020 | Wagner et al. | |
| 10,583,553 B2 | 3/2020 | Wagner et al. | |
| 10,596,696 B2 | 3/2020 | Wagner et al. | |
| 10,625,305 B2 | 4/2020 | Wagner et al. | |
| 10,625,432 B2 | 4/2020 | Wagner et al. | |
| 10,646,991 B2 | 5/2020 | Wagner et al. | |
| 10,649,445 B2 | 5/2020 | Wagner et al. | |
| 10,668,630 B2 | 6/2020 | Robinson et al. | |
| 10,843,333 B2 | 11/2020 | Wagner et al. | |
| 10,857,682 B2 | 12/2020 | Wagner et al. | |
| 10,906,188 B1 | 2/2021 | Sun et al. | |
| 10,913,614 B2 | 2/2021 | Wagner et al. | |
| 11,046,530 B2 | 6/2021 | Koga | |
| 11,055,504 B2 | 7/2021 | Wagner et al. | |
| 11,205,059 B2 | 12/2021 | Wagner et al. | |
| 2001/0052564 A1 | 12/2001 | Karlinger | |
| 2006/0064286 A1 | 3/2006 | Fink et al. | |
| 2006/0196300 A1 | 9/2006 | Kidooka et al. | |
| 2006/0242785 A1* | 11/2006 | Cawley | B65G 47/91 15/321 |
| 2007/0005179 A1 | 1/2007 | Mccrackin et al. | |
| 2010/0040450 A1 | 2/2010 | Parnell | |
| 2011/0243707 A1 | 10/2011 | Dumas et al. | |
| 2011/0255948 A1* | 10/2011 | Malinowski | B25J 15/0616 414/800 |
| 2012/0025053 A1* | 2/2012 | Tell | B25J 15/0616 248/363 |
| 2013/0110280 A1 | 5/2013 | Folk | |
| 2013/0147101 A1* | 6/2013 | Cho | H05K 13/0409 269/21 |
| 2013/0218335 A1 | 8/2013 | Barajas et al. | |
| 2013/0232919 A1 | 9/2013 | Jaconelli | |
| 2014/0154036 A1 | 6/2014 | Mattern et al. | |
| 2014/0195095 A1 | 7/2014 | Flohr et al. | |
| 2014/0244026 A1 | 8/2014 | Neiser | |
| 2015/0100194 A1 | 4/2015 | Terada | |
| 2015/0294044 A1* | 10/2015 | Schaer | G06F 17/10 703/2 |
| 2015/0298316 A1 | 10/2015 | Accou et al. | |
| 2015/0306770 A1 | 10/2015 | Mittal et al. | |
| 2015/0355639 A1 | 12/2015 | Versteeg et al. | |
| 2016/0075537 A1 | 3/2016 | Lundin | |
| 2016/0101526 A1 | 4/2016 | Saito et al. | |
| 2016/0176043 A1 | 6/2016 | Mishra et al. | |
| 2016/0205816 A1 | 7/2016 | Inoue et al. | |
| 2016/0243704 A1 | 8/2016 | Vakanski et al. | |
| 2016/0347545 A1 | 12/2016 | Lindbo et al. | |
| 2016/0347555 A1 | 12/2016 | Yohe et al. | |
| 2017/0062263 A1* | 3/2017 | Kesil | H01L 21/67259 |
| 2017/0087731 A1 | 3/2017 | Wagner et al. | |
| 2017/0121113 A1 | 5/2017 | Wagner et al. | |
| 2017/0156632 A1 | 5/2017 | Wagner et al. | |
| 2017/0157648 A1 | 6/2017 | Wagner et al. | |
| 2017/0197316 A1 | 7/2017 | Wagner et al. | |
| 2017/0225330 A1 | 8/2017 | Wagner et al. | |
| 2018/0057264 A1 | 3/2018 | Wicks et al. | |
| 2018/0265298 A1 | 9/2018 | Wagner et al. | |
| 2018/0265311 A1 | 9/2018 | Wagner et al. | |
| 2018/0273295 A1 | 9/2018 | Wagner et al. | |
| 2018/0273296 A1 | 9/2018 | Wagner et al. | |
| 2018/0273297 A1 | 9/2018 | Wagner et al. | |
| 2018/0273298 A1 | 9/2018 | Wagner et al. | |
| 2018/0281202 A1 | 10/2018 | Brudniok et al. | |
| 2018/0282065 A1 | 10/2018 | Wagner et al. | |
| 2018/0282066 A1 | 10/2018 | Wagner et al. | |
| 2018/0312336 A1 | 11/2018 | Wagner et al. | |
| 2018/0321692 A1 | 11/2018 | Castillo-Effen et al. | |
| 2018/0330134 A1 | 11/2018 | Wagner et al. | |
| 2018/0333749 A1 | 11/2018 | Wagner et al. | |
| 2018/0354717 A1 | 12/2018 | Lindbo et al. | |
| 2019/0015989 A1 | 1/2019 | Inazumi et al. | |
| 2019/0053774 A1* | 2/2019 | Weingarten | A61B 6/54 |
| 2019/0061174 A1 | 2/2019 | Robinson et al. | |
| 2019/0070734 A1* | 3/2019 | Wertenberger | B25J 15/0616 |
| 2019/0102965 A1 | 4/2019 | Greyshock et al. | |
| 2019/0127147 A1 | 5/2019 | Wagner et al. | |
| 2019/0185267 A1 | 6/2019 | Mattern et al. | |
| 2019/0217471 A1 | 7/2019 | Romano et al. | |
| 2019/0270197 A1 | 9/2019 | Wagner et al. | |
| 2019/0270537 A1 | 9/2019 | Amend, Jr. et al. | |
| 2019/0315579 A1* | 10/2019 | He | B65G 43/08 |
| 2019/0329979 A1 | 10/2019 | Wicks et al. | |
| 2019/0337723 A1 | 11/2019 | Wagner et al. | |
| 2019/0344447 A1 | 11/2019 | Wicks et al. | |
| 2019/0361672 A1 | 11/2019 | Odhner et al. | |
| 2020/0005005 A1 | 1/2020 | Wagner et al. | |
| 2020/0016746 A1 | 1/2020 | Yap et al. | |
| 2020/0017314 A1 | 1/2020 | Rose et al. | |
| 2020/0130935 A1 | 4/2020 | Wagner et al. | |
| 2020/0139553 A1 | 5/2020 | Dainkov et al. | |
| 2020/0143127 A1 | 5/2020 | Wagner et al. | |
| 2020/0164517 A1 | 5/2020 | Dick et al. | |
| 2020/0189105 A1 | 6/2020 | Wen et al. | |
| 2020/0223058 A1 | 7/2020 | Wagner et al. | |
| 2020/0223634 A1 | 7/2020 | Arase et al. | |
| 2020/0269416 A1 | 8/2020 | Toothaker et al. | |
| 2020/0306977 A1 | 10/2020 | Islam et al. | |
| 2020/0316780 A1 | 10/2020 | Rostrup et al. | |
| 2020/0346790 A1 | 11/2020 | Prakken et al. | |
| 2020/0376662 A1 | 12/2020 | Arase et al. | |
| 2021/0039140 A1 | 2/2021 | Geyer et al. | |
| 2021/0039268 A1 | 2/2021 | Anderson | |
| 2021/0053216 A1 | 2/2021 | Dainkov et al. | |
| 2021/0053230 A1 | 2/2021 | Mizoguchi et al. | |
| 2021/0094187 A1 | 4/2021 | Kanemoto et al. | |
| 2021/0114222 A1 | 4/2021 | Islam et al. | |
| 2021/0260762 A1 | 8/2021 | Arase et al. | |
| 2021/0260771 A1 | 8/2021 | Dainkov et al. | |
| 2021/0260775 A1 | 8/2021 | Mizoguchi | |
| 2021/0323157 A1 | 10/2021 | Usui et al. | |
| 2022/0135347 A1 | 5/2022 | Cohen et al. | |

FOREIGN PATENT DOCUMENTS

| | | | |
|---|---|---|---|
| CA | 3043018 A1 | 5/2018 | |
| CA | 3057334 A1 | 9/2018 | |
| CN | 103648730 A | 3/2014 | |
| CN | 104870147 A | 8/2015 | |
| DE | 20203095 U | 9/2002 | |
| DE | 102007008985 A1 * | 8/2008 | B25J 19/0025 |
| DE | 102007008985 A1 | 8/2008 | |
| DE | 202010007251 U1 | 10/2010 | |
| EP | 0317020 A2 | 5/1989 | |
| EP | 1661671 A1 | 5/2006 | |
| WO | 2006065147 A1 | 6/2006 | |
| WO | 2008059457 A1 | 5/2008 | |
| WO | 2014130937 A1 | 8/2014 | |
| WO | 2014166650 A1 | 10/2014 | |
| WO | 2015118171 A1 | 8/2015 | |
| WO | 2015162390 A1 | 10/2015 | |
| WO | 2019169418 A2 | 9/2019 | |
| WO | 2019230893 A1 | 12/2019 | |
| WO | 2020040103 A1 | 2/2020 | |

OTHER PUBLICATIONS

Communication pursuant to Rules 161(1) and 162EPC issued by the European Patent Office in related European Patent Application No. 20725323.8 dated Dec. 3, 2021, 3 pages.

International Search Report and Written Opinion of the International Searching Authority issued in related International Application No. PCT/US2020/029200 dated Aug. 11, 2020, 11 pages.

(56) References Cited

OTHER PUBLICATIONS

Anver Corporation, "Vacuum Tube Lifting Systems," Nov. 22, 2004 (http://www.jrgindustries.com/assets/anver.pdf), 36 pages.
Middelplaats L N M, Mechanical Engineering, Automatic Extrinsic Calibration and Workspace Mapping Algorithms to Shorten the Setup time of Camera-guided Industrial Robots, Master of Science Thesis for the degree of Master of Science in BioMechanical Engineering at Delft University of Technology, Jun. 11, 2014, pp. 1-144, XP055802468, retrieved from the Internet: URL:http://resolver.tudelft.nl/uuid:0e51ad3e-a-2384d27-b53e-d76788f0ad26 [retrieved on May 7, 2021] the whole document, 138 pages.
Examiner's Report issued by the Innovation, Science and Economic Development Canada (Canadian Intellectual Property Office) in related Canadian Patent Application No. 3,136,859 dated Jan. 30, 2023, 4 pages.
Notice on the First Office Action, along with its English translation, issued by the China National Intellectual Property Administration in related Chinese Patent Application No. 202080029110.4 dated Mar. 31, 2023, 23 pages.

\* cited by examiner

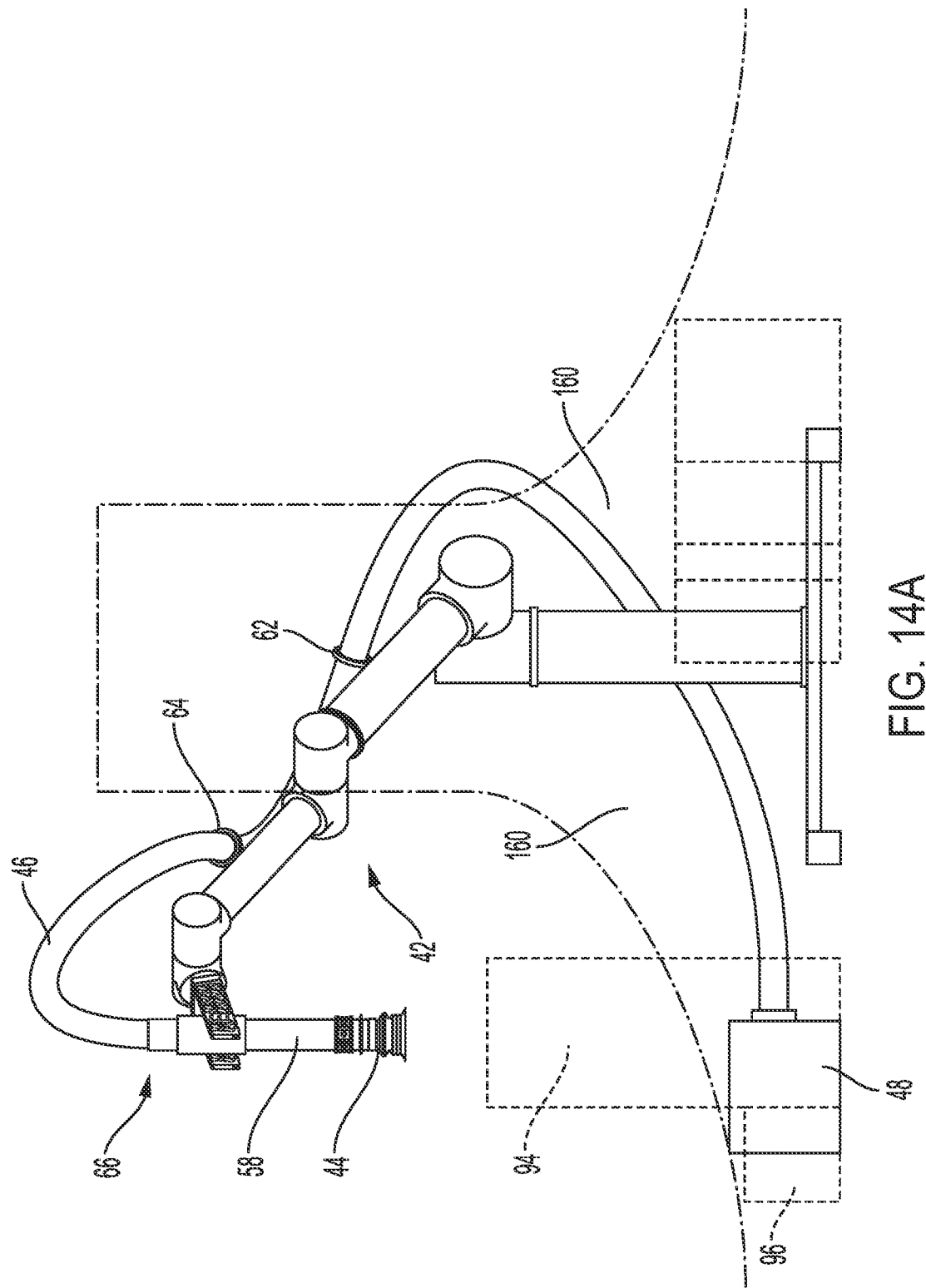

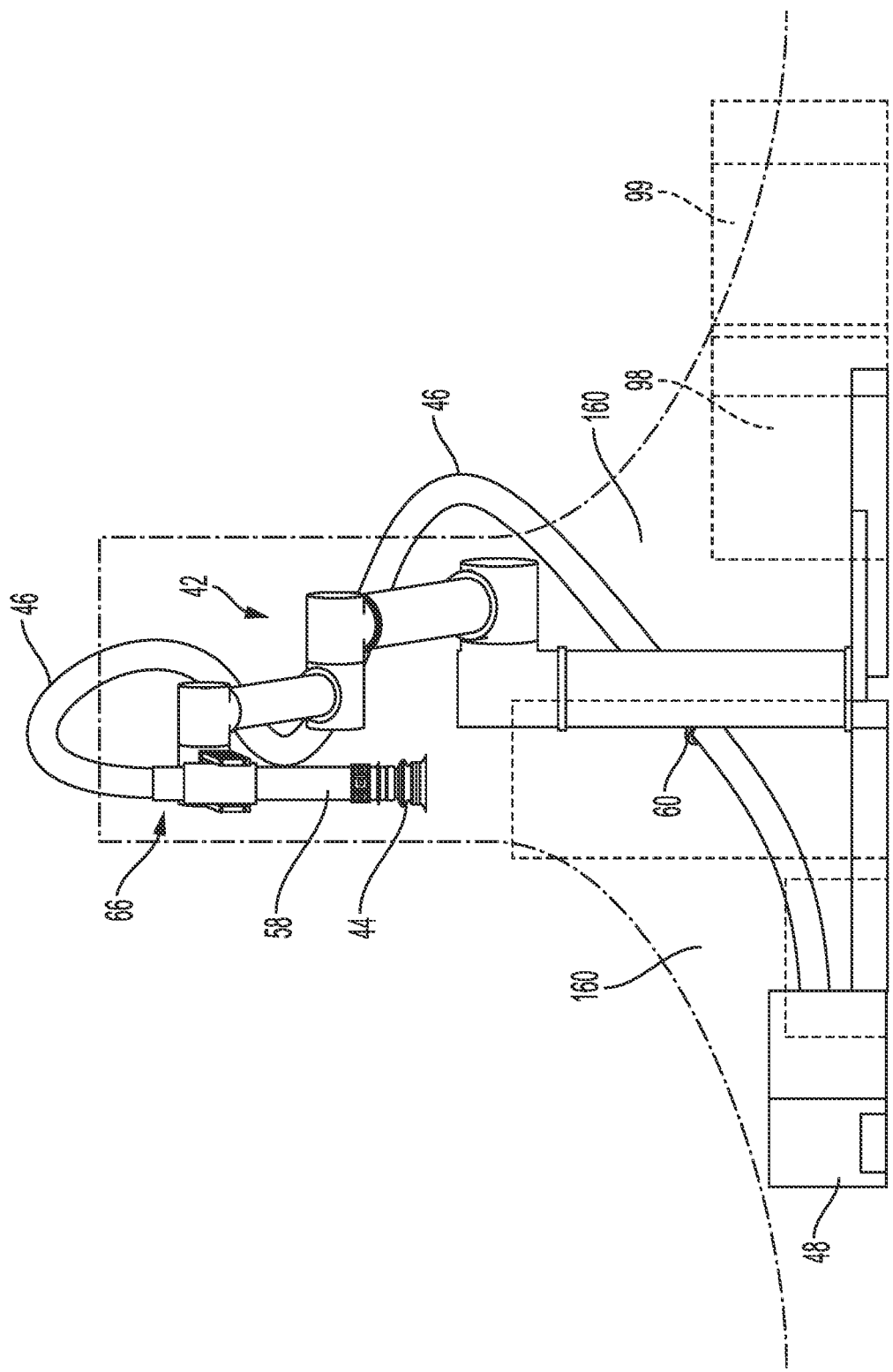

SYSTEMS AND METHODS FOR MAINTAINING VACUUM HOSE LIFE IN HOSE ROUTING SYSTEMS IN PROGRAMMABLE MOTION SYSTEMS

PRIORITY

The present application claims priority to U.S. Provisional Patent Application Ser. No. 62/838,747, filed Apr. 25, 2019, the disclosure of which is hereby incorporated by reference in its entirety.

BACKGROUND

The invention generally relates to programmable motion systems, and relates in particular to robotic systems, such as robotic pick-and-place systems whose task is to move objects from one location to another. The application for such systems could include any kind of material handling system that might benefit from automation, including automated package handling, automated order fulfillment, or automated store stock replenishment.

Some such robotic pick-and-place systems may employ vacuum gripping to pick items. Many common vacuum systems generate a vacuum at the end effector using a Venturi pump, which involves providing high pressure (typically 80 psi) air blown over an aperture to generate a vacuum at the aperture, and which vacuum is used for picking up objects, such as products, packages, boxes, shipping bags, etc. These systems require a low enough quantity of air that a small diameter (e.g., less than ¼") hose can be used to supply the high-pressure air at the end-effector. Such small diameter hoses are flexible enough, e.g., have a small enough bending radius, that they may be easily routed to the end-effector in a way that accommodates the motion of the robot e.g., an articulated arm in a large workspace. In such systems, the routing of the hose, for example, typically follows the contours of the articulated arm, bending or rotating with each joint of the articulated arm.

On the other hand, some robotic pick-and-place systems have been designed to grip items where leaks cannot be prevented. In order to sustain a vacuum, the system needs to compensate for the air loss from leaks. Such systems therefore must be able to pull a large amount of air through the vacuum gripper compared with the aforementioned Venturi pump-generated vacuum approach. These higher flow vacuum sources cannot typically be generated at the end-effector, and instead are often generated by a stationary blower placed near the robot. In such systems, however, instead of having a small amount of high-pressure air being pushed to the end-effector through a small hose, significantly more air is pulled from the end-effector by a lower pressure vacuum over a much larger hose. Because friction in the hose increases with the square of the air speed, the higher air flow necessitates a larger hose. Doubling the hose diameter halves the required air speed for the same volumetric air flow, thus larger diameter hoses reduce friction and losses.

Larger diameter hoses, however, are problematic. Larger diameter hoses are less flexible, they take up more space, and they are heavier, all of which makes it difficult to provide the robot with the freedom of movement within a large workspace. Larger hoses need to be rigid enough to withstand collapse under vacuum, yet pliable enough to provide enough flexibility to accommodate the movement of the robot arm in its workspace. Many such hoses are made of plastic and attain their limited flexibility by being designed in a helical configuration, where, for example, a continuous helical lip is provided along the length of the hose. FIG. 1, for example, shows two such hoses at 10 and 12. The hose 10 includes a helical lip 14, and may have an inner diameter $d_1$ of about 2 cm to about 4 cm. The hose 12 includes a helical lip 16, and may have an inner diameter $d_2$ of about 4 cm to about 8 cm.

Where a bend forms in the hose, the bend in the lip has some freedom of movement that gives the overall hose some bending compliance. The bend in the continuous lip, however, may fail under cyclic loading, e.g., if the hose is repeatedly bent beyond its intended bending radius, or if it is repeatedly bent and unbent over a relatively long period of time. A robotic pick-and-place system, for example, may undergo millions of back-and-forth movements per year, and a poorly designed air handling design that subjects a hose to millions of bends per year will cause the hose to fail. Such movements may also result in significant torsional stresses. Additionally, because the bend portion of the hose is part of any overall hose system, there will be torques that are applied to the hose, including the bend portion of the hose, that will also directly affect the overall performance of the hose section.

Further, the energy (potential energy) stored in a hose bend increases quadratically with the amount of bend in the hose (by comparison of course, a straight hose would have no such potential energy). A hose with a bend, for example, of 10 degrees at a bend location, would have four times the amount of potential energy at the bend location than it would if the degree of bend was only 5 degrees. The storage (and release) of potential energy in portions of a hose is not desired for a number of reasons including, it may produce forces on other portions of the hose, it creates stress at the bend location of the hose, and some of the stored potential energy is converted to heat in the hose, further potentially degrading the quality of the hose material at the bend.

FIGS. 2A-2D show a pair of adjacent arm sections 20, 22 of an articulated arm programmable motion system, where each arm section 20, 22 is connected to a joint 24 having an axis of rotation A about which the arm sections 20, 22 may be rotated with respect to each other as shown. A section of the hose that is near the joint, referred to herein as a joint section of the hose 26, moves with the arms sections, but may become bound up against itself as shown at 28 in FIG. 2D when the arm sections are rotated very close to one another. The hose section shown in FIG. 2D for example, would have substantial potential energy stored in the hose section, causing wear and potential degradation of the hose material.

With reference to FIGS. 3A and 3B, a hose section 36 mounted on the outside of a joint 34 as arm sections 30, 32 rotate, may even bind against the joint itself as shown in FIG. 3B. As the robot's arm bends at the joint, the hose bends in the same plane. In other words, as the robot's arm rotates about the axis during a motion, the hose bends with it, causing significant changes in the bending of the hose. Further, as the joint rotates from an angle (e.g., 90 degrees) to vertical (e.g., 180), and then further to an opposite angle, the hose must accommodate the changes in angular positions. As mentioned above, such an operation may be repeated many millions of times, which will cause significant strain on common plastic hoses. Certain further types of hose routing systems involve having a mechanism for gathering or releasing a hose (e.g., slack) as the articulated arm extends or rotates.

The requirements for mobility and freedom of movement within the workspace are particularly challenging. In addition to needing the hose to bend, a robot that swings up to 360 degrees about its base will need the hose to twist. The end-effector often needs to attain a large number of possible orientations in certain applications, which means that the attachment from the end-effector to the hose needs to accommodate the multitude of directions in which the hose mount needs to point as the robot moves from one place to another, for example, picking up items in arbitrary orientations.

Again with reference to systems that employ smaller hoses at high vacuum, such systems may even employ hose and cable guides that closely follow the articulated sections of the robot, and in such systems, the length of the cable guides is not as much a concern as compared to the need to gather and dispense cable guide lengths as the high vacuum robot moves. Such system however, are not suitable for high vacuum flow systems employing large diameter hoses that permit objects to be grasped without having the end effector fully seal against an object.

While cable routing schemes exist for numerous types of cables therefore, and are suitable for narrow hoses, none satisfies the needs of using a large diameter hosing system on a small scale robot. There remains a need therefore, for a hose routing scheme for large diameter hoses in programmable motion devices.

SUMMARY

In accordance with an aspect, the invention provides a programmable motion robotic system that includes a plurality of arm sections that are joined one to another at a plurality of joints to form an articulated arm, and a hose coupling an end effector of the programmable motion robotic system to a vacuum source. The hose is attached to at least one arm section of the articulated arm by a pass-through coupling that permits the hose to pass freely through the coupling as the plurality of arm sections are moved about the plurality of joints.

In accordance with another aspect, the invention provides a programmable motion robotic system that includes a plurality of arm sections that are joined one to another at a plurality of joints to form an articulated arm, and a hose coupling an end effector of the programmable motion robotic system to a vacuum source. The hose is attached, in a joint portion of the hose, to at least two arm sections with a joint between the at least two arm sections, such that the hose is coupled to one arm section of the at least two arm sections by a pass-through coupling that permits the hose to pass freely through the coupling when the one arm section is rotated about the joint with respect to another arm section of the at least two arm sections.

In accordance with a further aspect, the invention provides a method of minimizing forces on a hose in a programmable motion system that includes an end effector on an articulated arm that is coupled to a vacuum source by the hose. The method includes providing a pass-through coupling on an arm section of the articulated arm, moving the arm section of the articulated arm, and permitting the hose to move through the pass-through coupling to reduce any of binding or bending of the hose.

BRIEF DESCRIPTION OF THE DRAWINGS

The following description may be further understood with reference to the accompanying drawings in which:

FIGS. 14A and 14B show illustrative diagrammatic views of the articulated arm system of FIG. 40 showing a restricted area from different side directions;

The drawings are shown for illustrative purposes only.

DETAILED DESCRIPTION

In accordance with various aspects, the invention provides a method of mounting a large diameter cabling or hose on a multi-link mechanical system that (1) minimizes changes to the bending of a hose during motion, and (2) minimizes the maximum bending of such a hose in potential robot configurations. Further, since the vacuum decreases with the length of the hose (due, in part, to friction against the inner hose surface), and the vacuum decreases with the amount of bend in a hose (again due to friction against the bent inner hose surface), it has been generally desirable to provide a hose that is as short as possible and has the least amount of bending.

Figure 1:
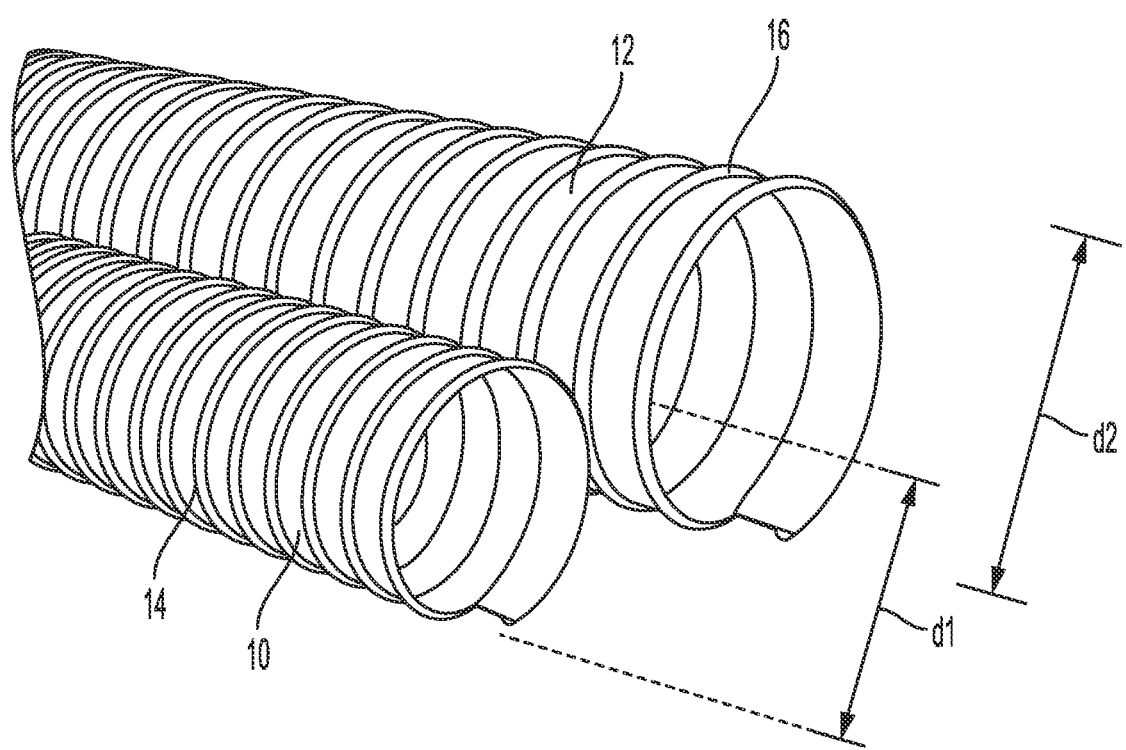
FIG. 1 shows an illustrative diagrammatic view of two large diameter hoses.
Figure 2B:
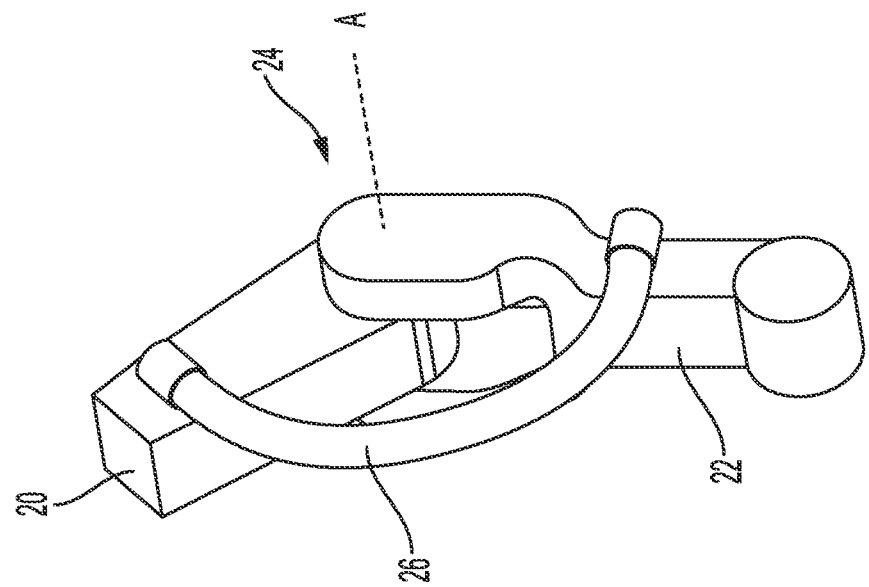
FIGS. 2A-2D show illustrative diagrammatic views of two arm sections of an articulated arm with a section of a hose attached to the arm sections of the prior art with the hose section inside of a bend joint.
Figure 2A:
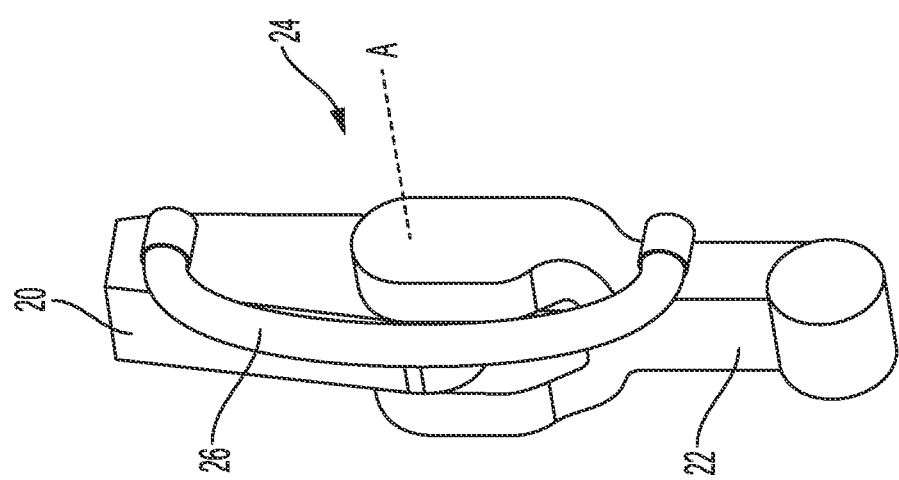
Figure 2C:
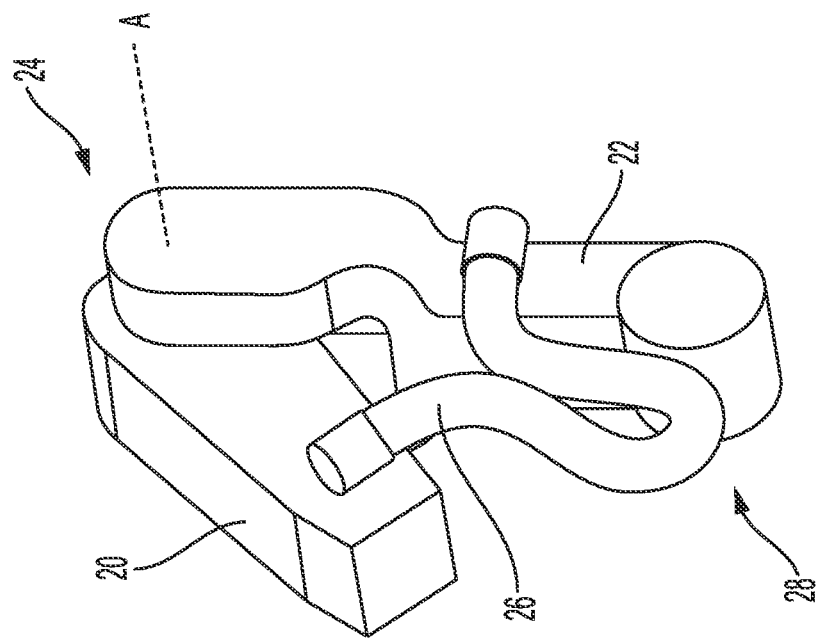
Figure 2D:
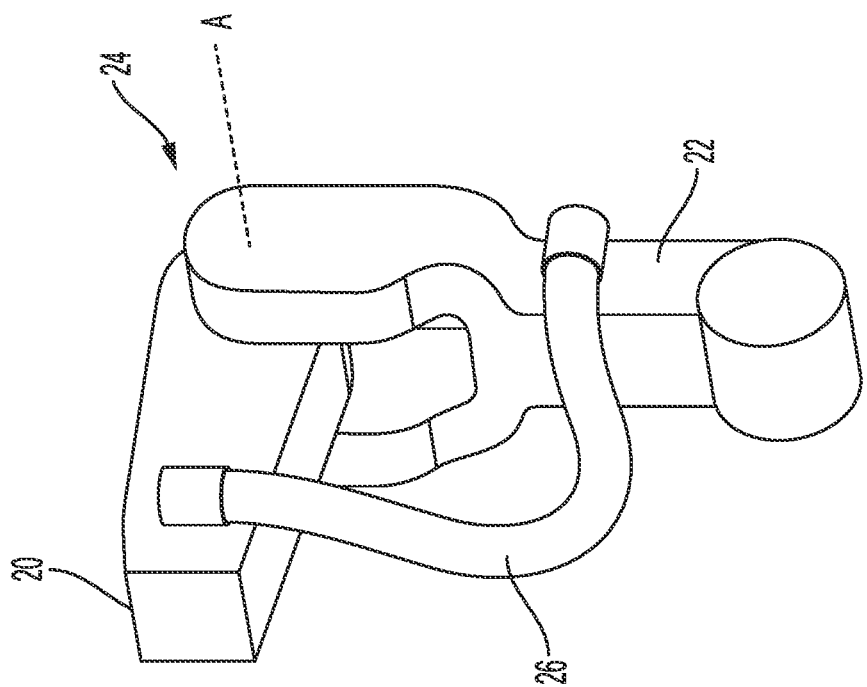
Figure 3B:
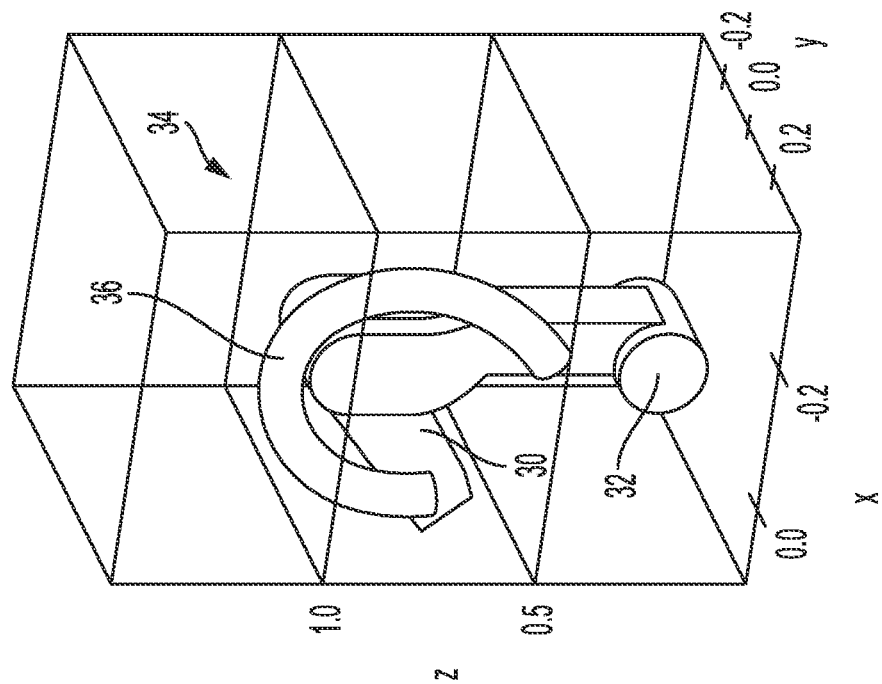
FIGS. 3A and 3B show illustrative diagrammatic views of two arm sections if an articulated arm with a section of hose attached to the arm sections of the prior art with the hose section outside of the bend joint.
Figure 3A:
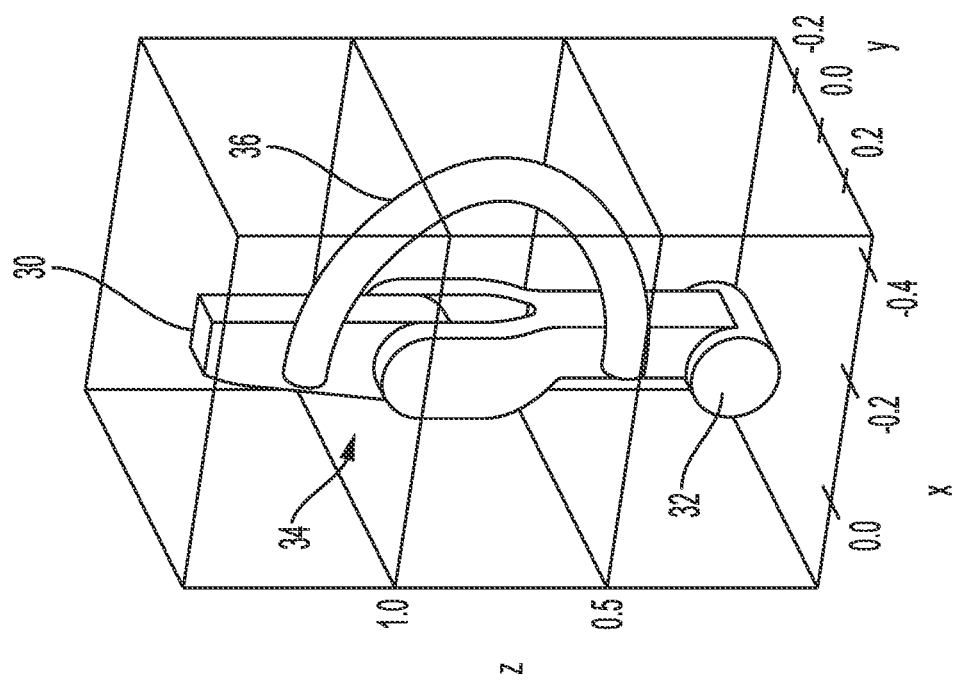
Figure 4:
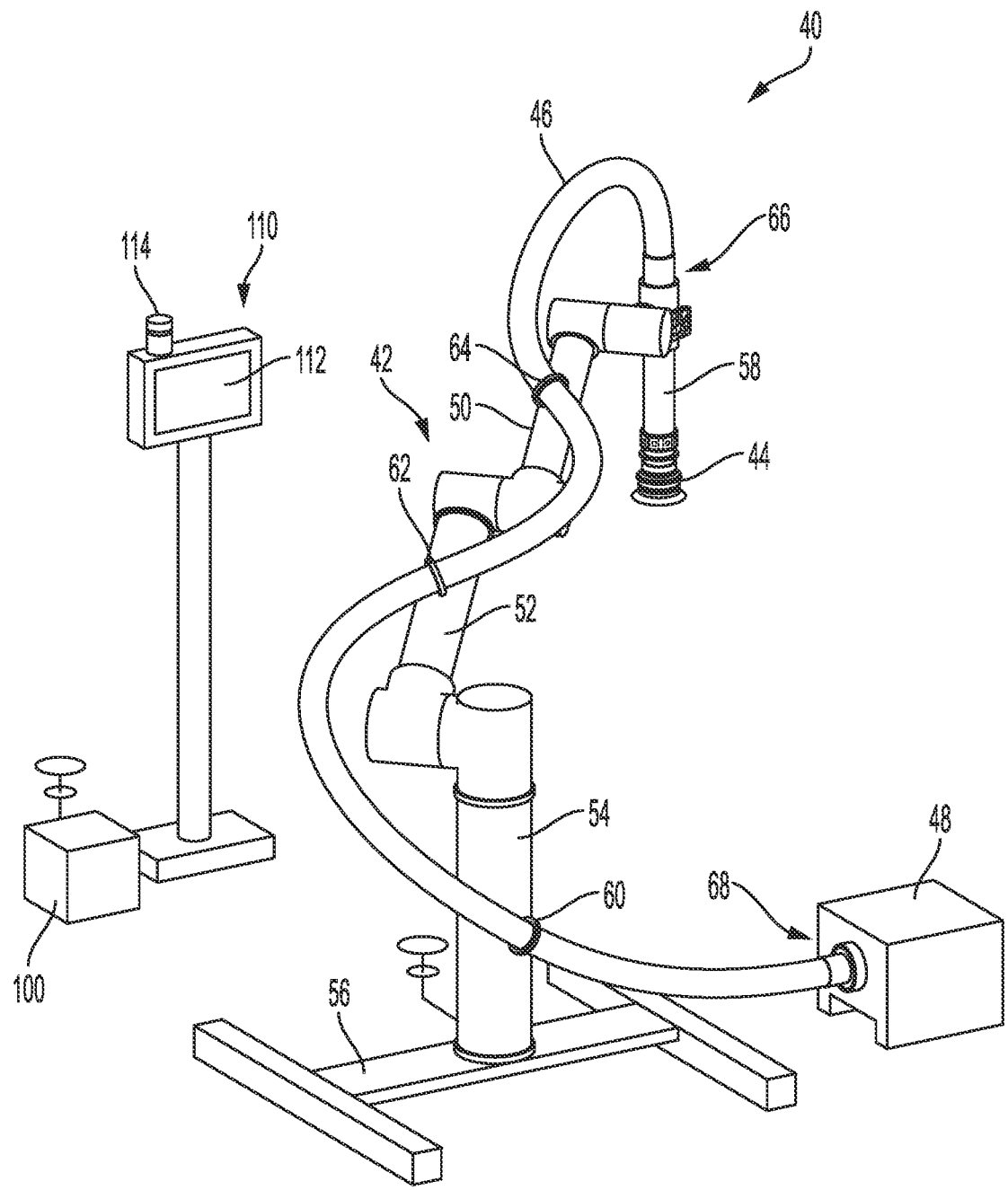
FIG. 4 shows an illustrative diagrammatic view of an articulated arm system employing pass-through couplings in accordance with an embodiment of the present invention.

With reference to FIG. 4, in accordance with an embodiment, the invention provides a system 40 that includes a programmable motion device such as an articulated arm 42 that includes an end effector 44, such as a flexible bellows, that is coupled via a vacuum hose 46 to a vacuum source 48. In accordance with various aspects, the vacuum at the end effector may have a flow rate of at least 100 cubic feet per minute, and a vacuum pressure of no more than 65,000 Pascals below atmospheric (e.g., about 50 Pascals below atmospheric or 7.25 psi). The hose may have an inner diameter of at least 1 inch, e.g., 2 inches, (or at least 3 inches), and may include a helical ribbing as discussed above.

Figure 11:
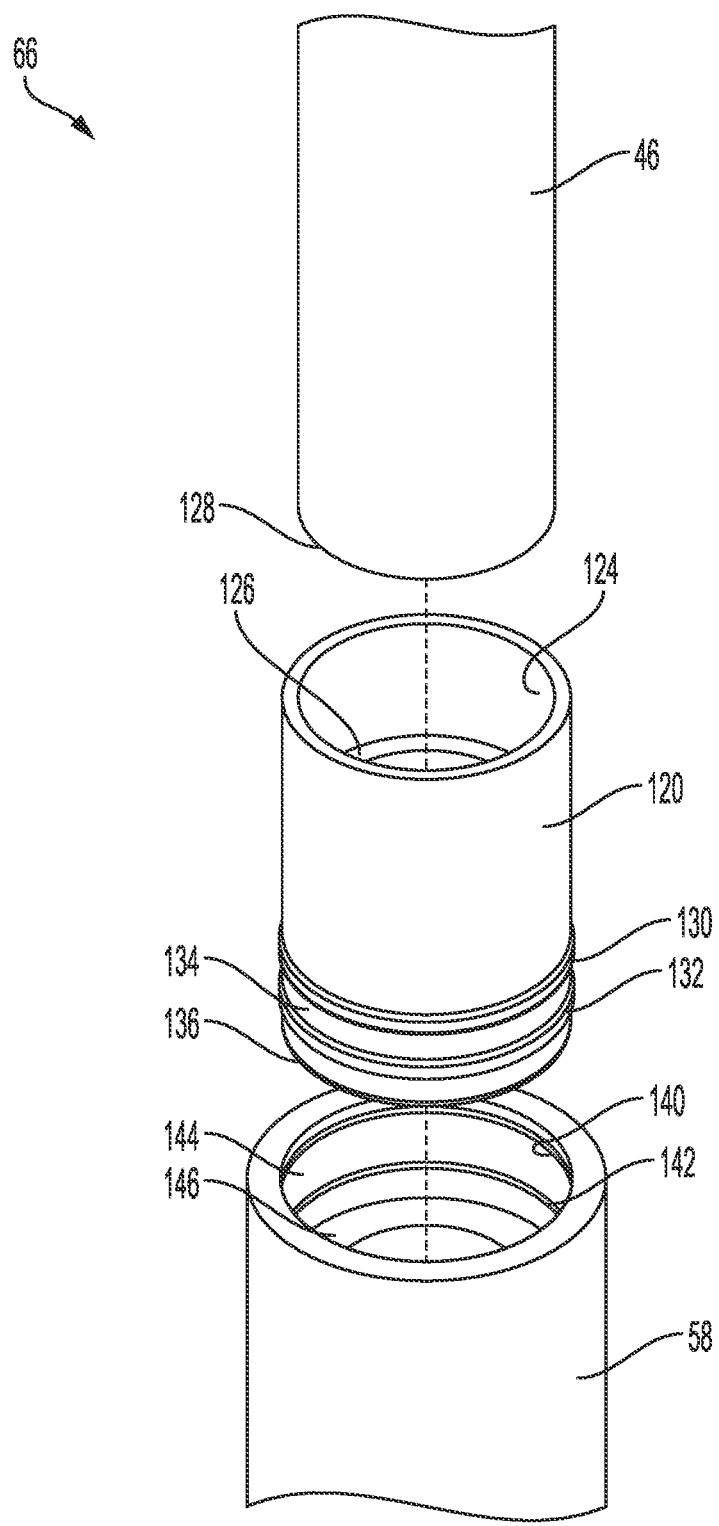
FIG. 11 shows an illustrative diagrammatic view of a rotational coupling for use in the articulated arm system of FIG. 4.

The articulated arm 42 includes arm sections 50, 52, 54, as well as a base 56 and an end effector section 58 to which the end effector 44 is attached. In accordance with certain aspects of the invention, the vacuum hose 46 is coupled to certain hose sections by pass-through couplings 60, 62, 64. Significantly, the pass-through couplings 60, 62, 64, permit the vacuum hose 46 to move freely through the couplings as the articulated arm 42 is moved. Further, each pass-through coupling may also be mounted to a respective arm section such that the pass-through coupling may pivot with respect to the respective arm section. The system 40 may also include a first rotational coupling 66 that couples the hose 46 to the end effector section 58, as well as a second rotational coupling 68 that couples the hose 46 to the vacuum source 48 as discussed in further detail below with reference to FIGS. 11-13. Movement of the articulated arm may be controlled by one or more processing systems 100 that communicate via a wired or wireless communication system with the articulated arm, with any cameras in the environment of the articulated arm, and with a communication device 110 that may include a display 112 and a re-set button 114. The communication device 110 may provide information regarding the articulated arm system to any human personnel in the robotic environment, and may permit any human personnel to re-set the articulated arm to a home position in the event of a high risk situation such as if the articulated arm has turned about the base more than 360 degrees and may bind the hose.

Figure 5B:
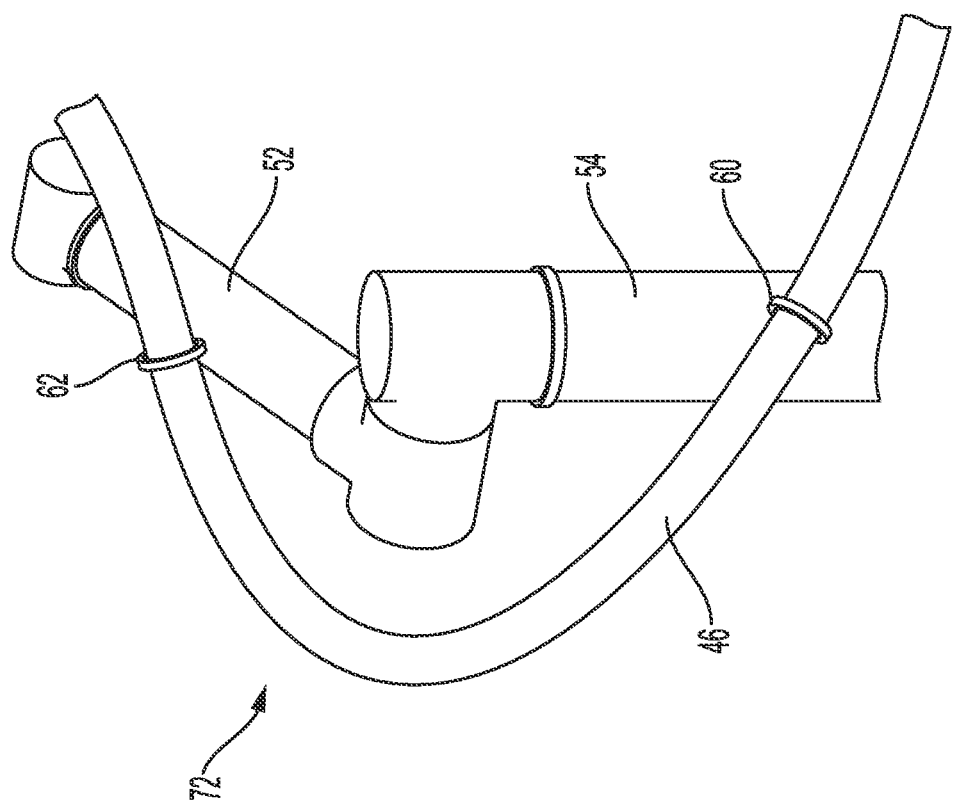
FIGS. 5A and 5B show illustrative diagrammatic views of a portion of the articulated arm system of FIG. 4 showing a pair of adjacent arm sections in different respective positions.
Figure 5A:
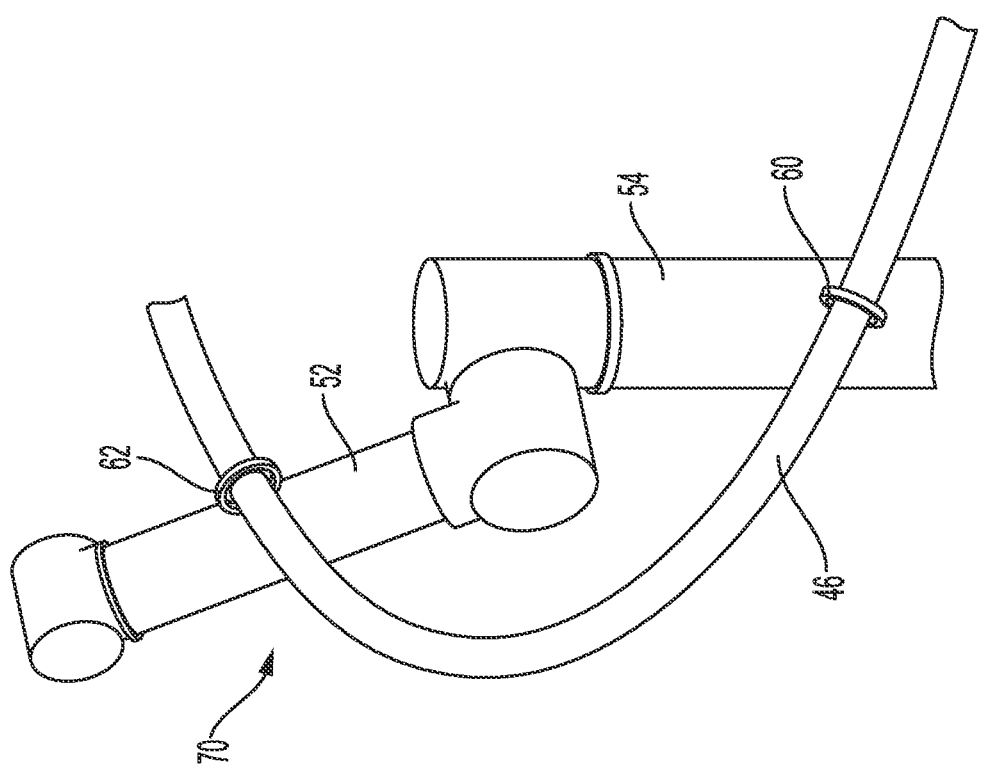

With reference to FIGS. 5A and 5B, when adjacent arm sections (e.g., 52, 54) move with respect to each other, a section 70 of the vacuum hose 46 that is positioned between two pass-through couplings 60, 62 will move. In particular, the section of the vacuum hose 46 may become larger as shown at 72 in FIG. 5B due to the movement of the arm sections of the articulated arm 42. The pass-through couplings permit the vacuum hose to move in ways that relieve stress and strain on the hose as the articulated arm sections move.

The pass-through couplings may be fixed, may provide swiveling, and/or may provide translation of the hose through the attachments in various aspects. The swivel attachments may also have more than one degree of freedom (DOF). While the swivel may only allow rotation of the hose about an axis that is in the plane of the motion, a swivel joint may accommodate other additional DOFs including: the hose may twist through the mount to reduce torsion on the hose, the hose may slip through the mount to lengthen or shorten the hose segment between attachment points, and the attachment may permit small deflections of the rotation axis also to reduce total bending energy.

Figure 6B:
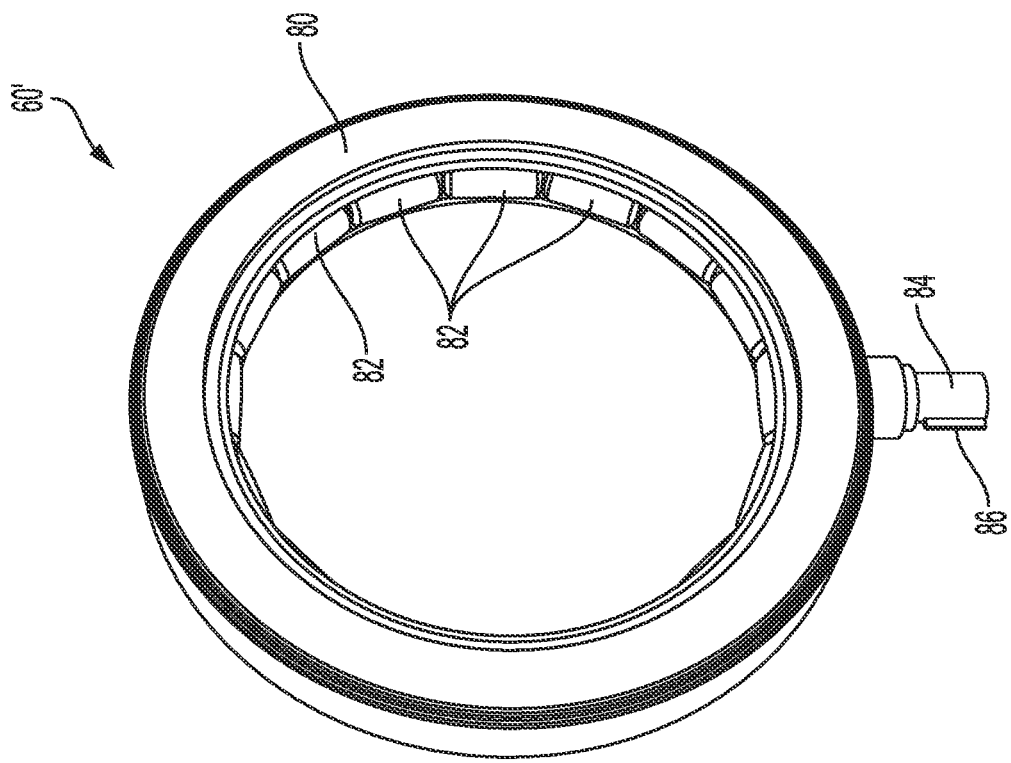
FIGS. 6A and 6B show illustrative diagrammatic views of pass-through couplings for use in connection with various aspects of the present invention.
Figure 6A:
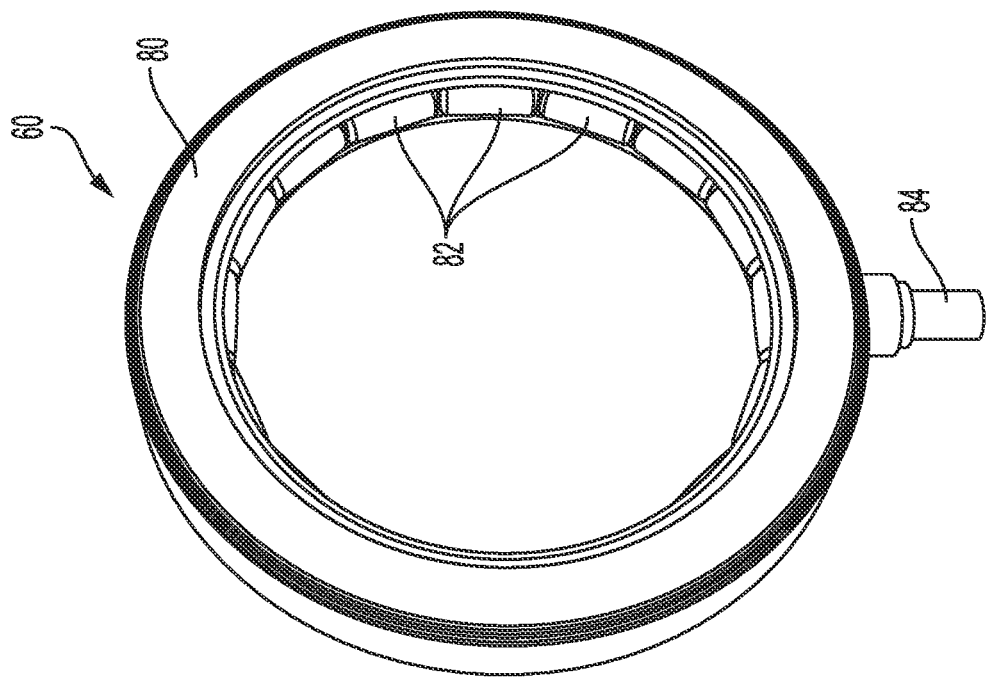

FIGS. 6A and 6B show pass-through couplings for vacuum hoses in accordance with various aspects of the present invention. The pass-through coupling 60 of FIG. 6A includes a ring 80 as well as optional inner rollers 82 that facilitated the passing through of a vacuum hose through the coupling 60. The ring 80 may include a mounting post 84 for mounting to an arm section of an articulated arm. The mounting post 84 may be free to rotate with respect to the arm section to which it is mounted, permitting the coupling 60 to rotate with the mounting post 84. The pass-through coupling 60' of FIG. 6B may include a ring 80 as well as optional inner rollers 82 that facilitated the passing through of a vacuum hose through the coupling 60', and may further include a keyed edge 86 that engages a slot in an articulated arm, to prevent the pass-through coupling 60' from rotating with respect to the arm section to which it is attached in accordance with a further aspect of the invention.

Figure 7A:
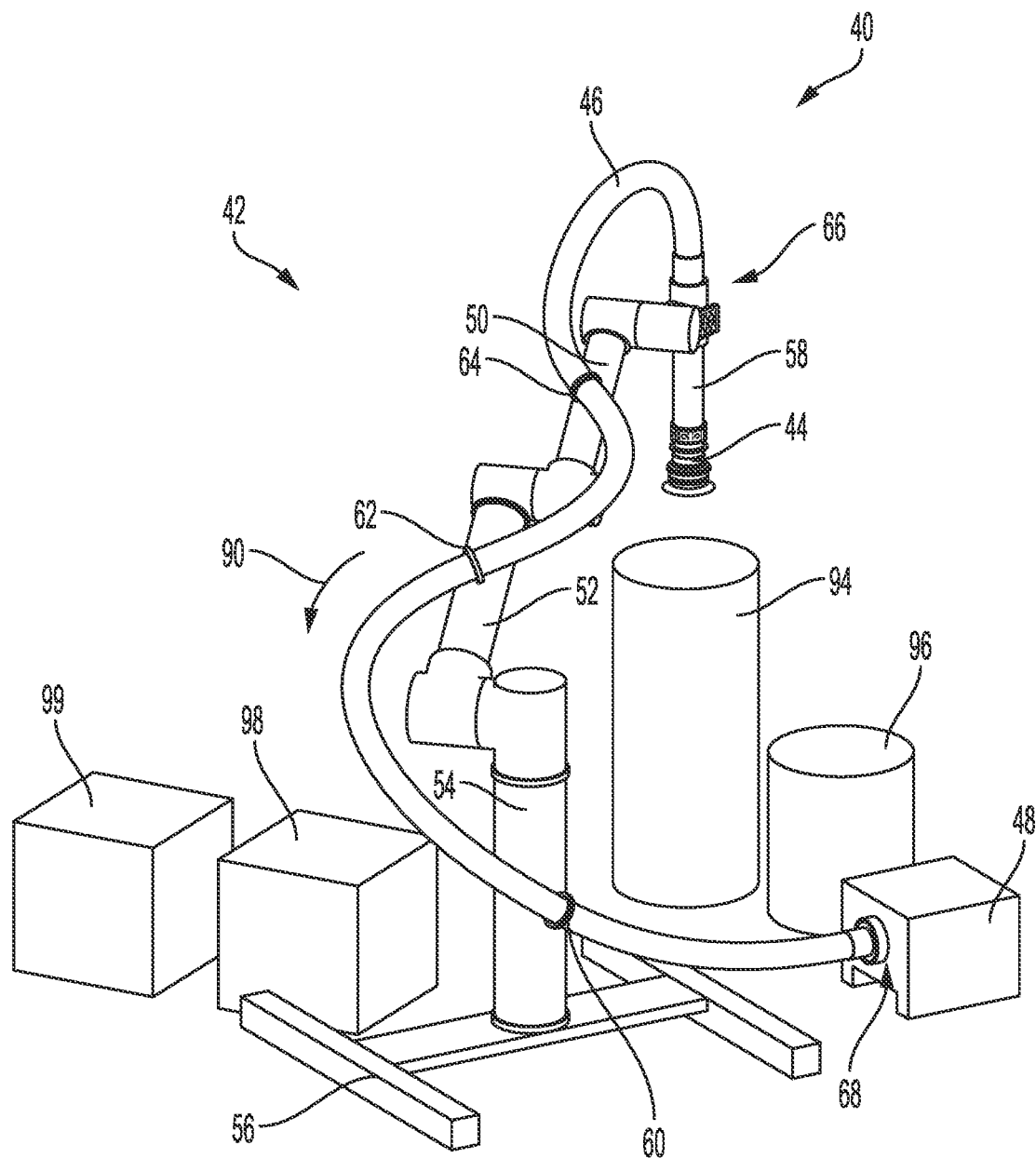
FIGS. 7A and 7B show illustrative diagrammatic views of the articulated arm system of FIG. 4 in different positions while processing objects near a vacuum source in accordance with an aspect of the present invention.

FIG. 7A shows the system 40 including an articulated arm 42 engaging objects 94, 96, 98, 99 in its environment, and in particular shows the end effector 44 on the end effector section 50 about to engage the object 94. The system 40 includes the pass-through hose couplings 60, 62, 64 that permit the hose 46 to freely pass through the couplings while the articulated arm moves about its environment.

Figure 7B:
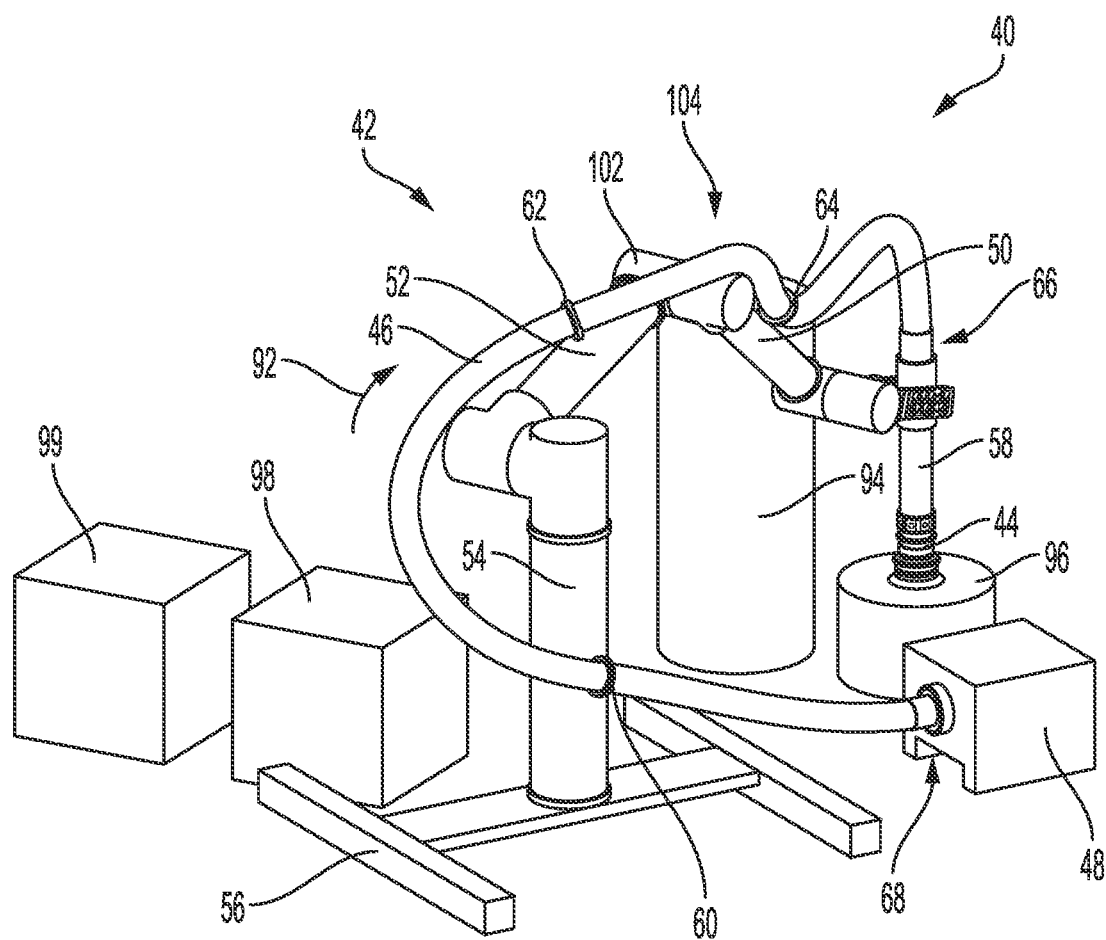

There may be situations however, in which the high vacuum flow hose undergoes stress, even though the end effector 44 may be accessing an area that is well within the reach of the articulated arm. FIG. 7B for example, shows the end effector 44 of the articulated arm 42 accessing a low object 96 that is well within the reach of the end effector section of the articulated arm. As the arm section 52 moves with respect to the arm section 54, the pass-through couplings 60, 62 permit the hose to relieve build-up of stress and potential energy on the hose as shown at 90 in FIG. 7A and 92 in FIG. 7B. Although the object 96 is well within the reach of the end effector section 50 and the end effector 44, accessing such a position may impart unwanted stress on the hose. For example, the hose 42 may bind up on a joint 102 in a portion 104 of the hose as shown in FIG. 7B. While the hose may be flexible and the helical configuration may facilitate accommodating bending, such actions repeated over time will decrease the life of the hose. It is important, therefore, that the hose be free to move through the couplings in order to reduce any such binding on joints.

Figure 8A:
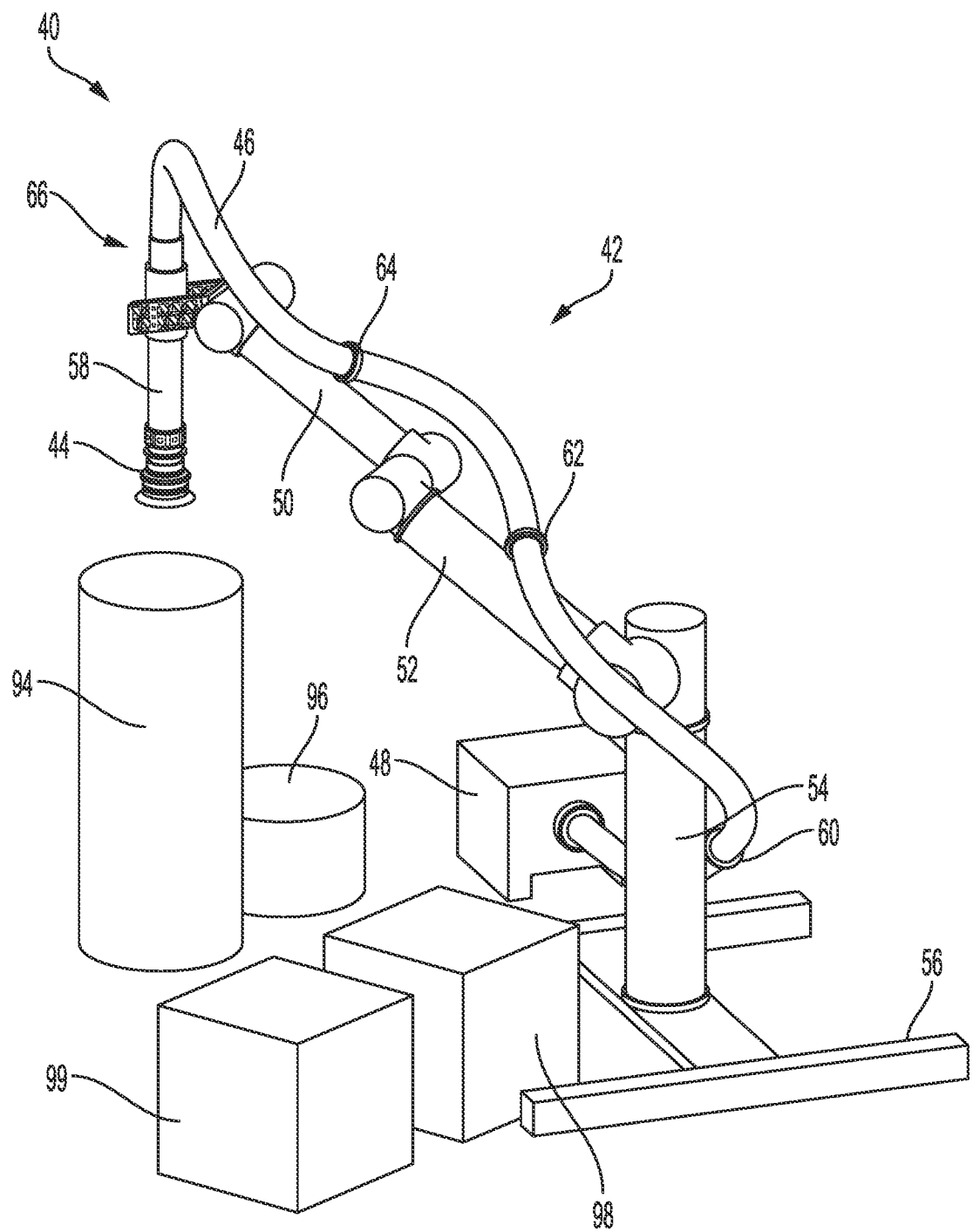
FIGS. 8A and 8B show illustrative diagrammatic views of the articulated arm system shown in FIGS. 7A and 7B from different views, showing different views of the hose routing.
Figure 8B:
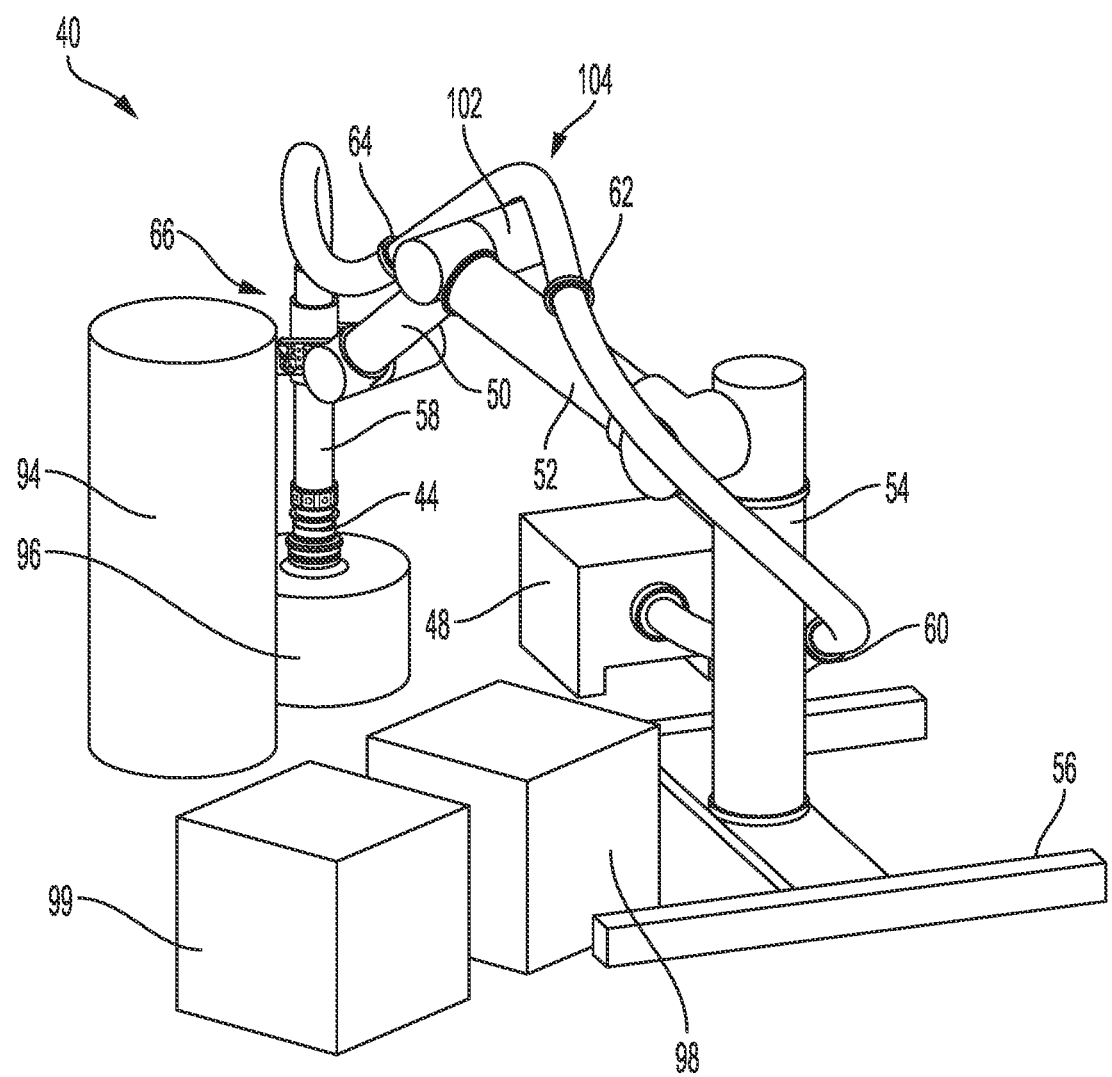

FIGS. 8A and 8B show alternate views of the system 40 as shown in FIGS. 7A and 7B. As shown in FIG. 8A, the hose remains fairly free of stress and build-up of potential energy when the end effector 44 is accessing the object 94, but when the end effector 44 accesses the lower object 96, the section 104 of the hose binds up on the joint 102 between arm sections 50, 52. Again, such actions repeated over time will decrease the life of the high flow vacuum hose which is why it is important for the hose to be able to reduce any buildup of potential energy in the hose.

Figure 9A:
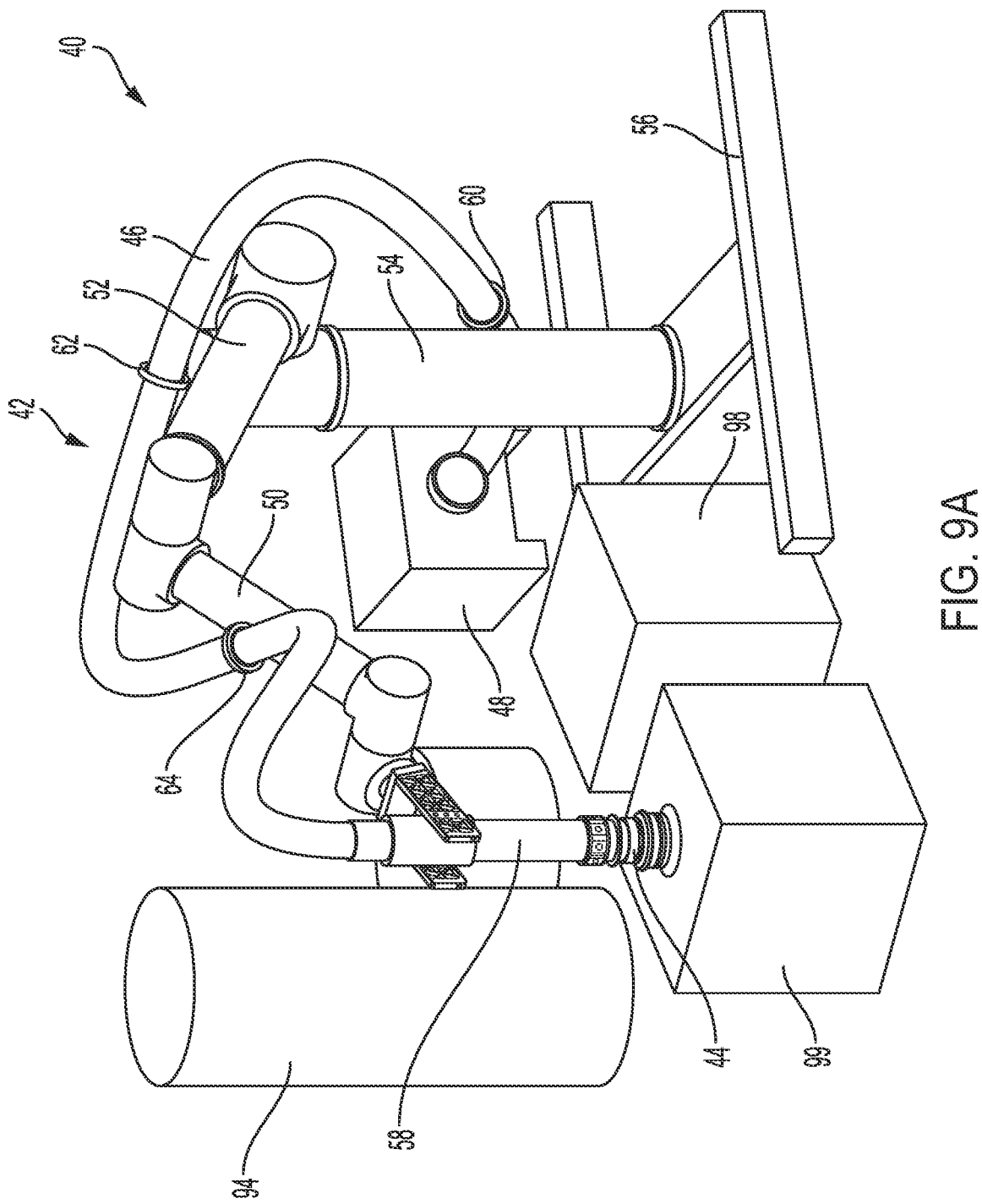
FIGS. 9A and 9B show illustrative diagrammatic views of the articulated arm system of FIG. 4 in different positions while processing objects near a base of the articulated arm system in accordance with an aspect of the present invention.

FIG. 9A shows the system 40 including an articulated arm 42 again engaging objects 94, 96, 98, 99 in its environment, and in particular shows the end effector 44 on the end effector section 50 engaging the object 99. The system 40 includes the pass-through hose couplings 60, 62, 64 that permit the hose 46 to freely pass through the couplings while the articulated arm moves about its environment. Again, there may be situations however, in which the high vacuum flow hose undergoes stress, even though the end effector 44 may be accessing an area that is well within the reach of the articulated arm, and the freedom of the hose to move reduces this stress.

Figure 9B:
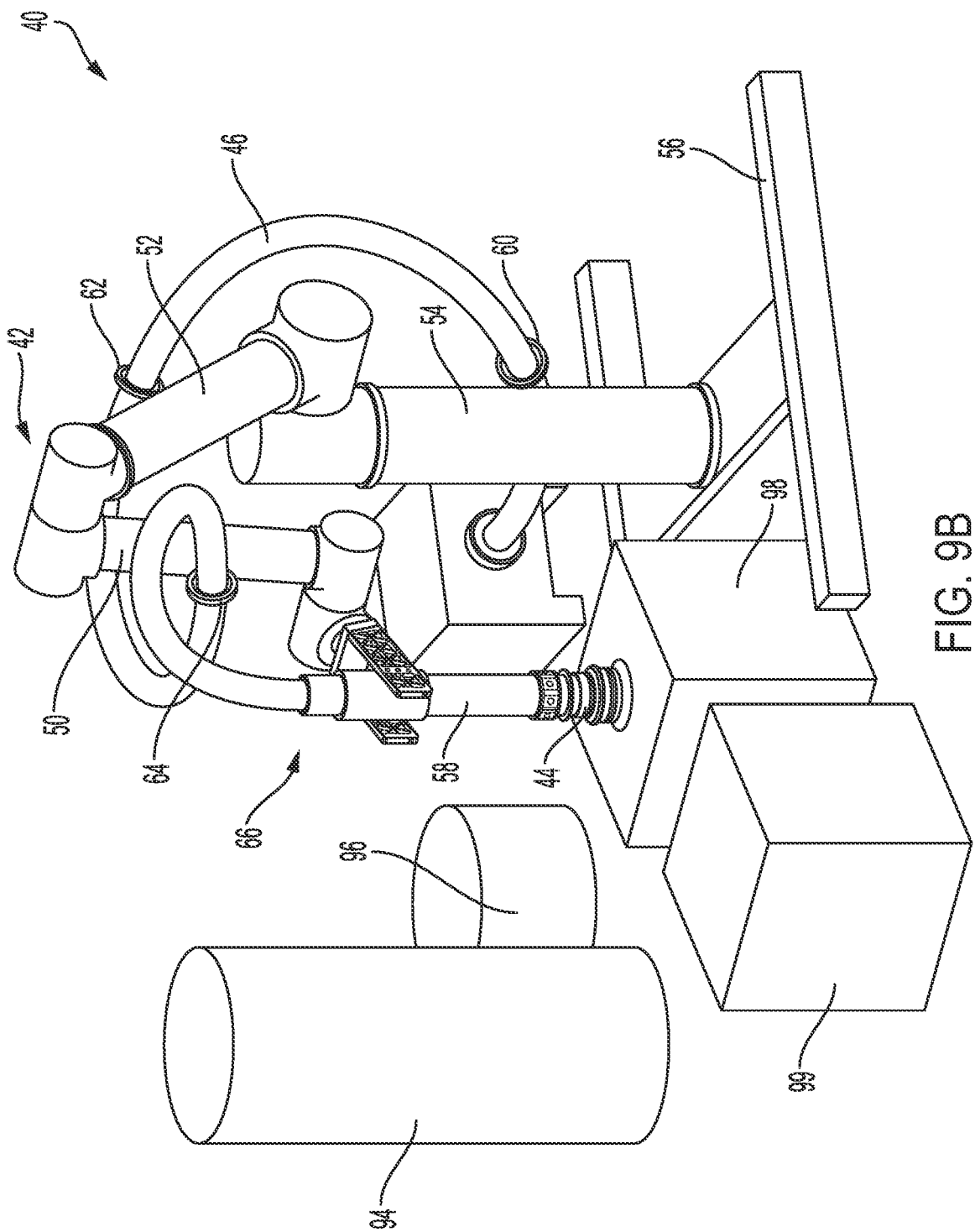

FIG. 9B for example, shows the end effector 44 of the articulated arm 42 accessing a low and close-by object 98 that is well within the reach of the end effector section 58 of the articulated arm. As the arm section 50 and the end effector section 58 move close to the central section 54, the pass-through couplings 62, 64 permit the hose to relieve build-up of stress and potential energy on the hose. Although the object 98 is well within the reach of the end effector section 50 and the end effector 44, accessing such a position may impart unwanted stress on the hose. For example, the hose 42 may bend too much in one or more portions 106, 108 of the hose as shown in FIG. 9B. Again, while the hose may be flexible and the helical configuration may facilitate accommodating bending, such actions repeated over time will decrease the life of the hose, which is why permitting the hose to move through the couplings is important in accordance with certain aspects of the present invention.

Figure 10A:
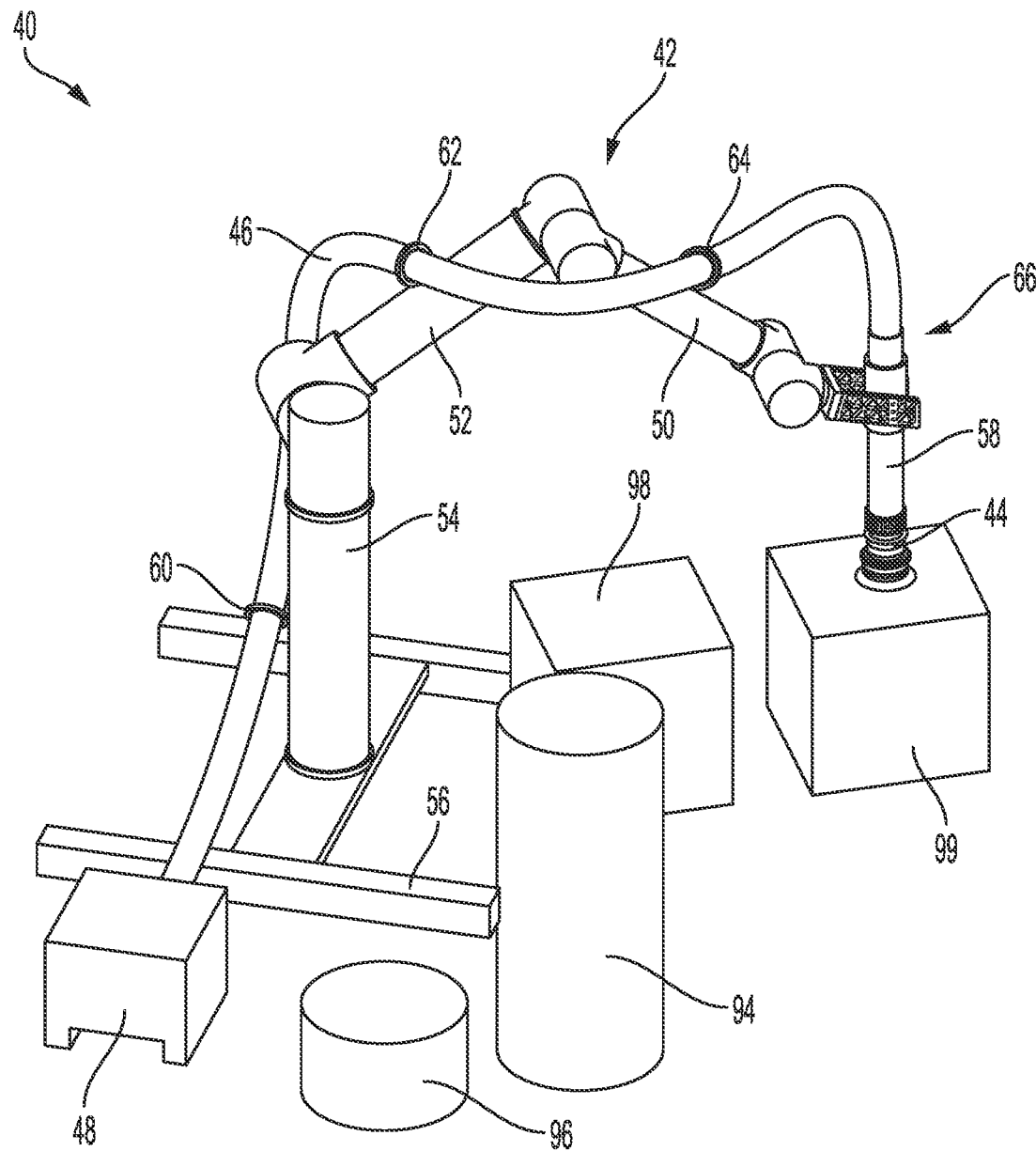
FIGS. 10A and 10B show illustrative diagrammatic views of the articulated arm system shown in FIGS. 9A and 9B from different views, showing different views of the hose routing.
Figure 10B:
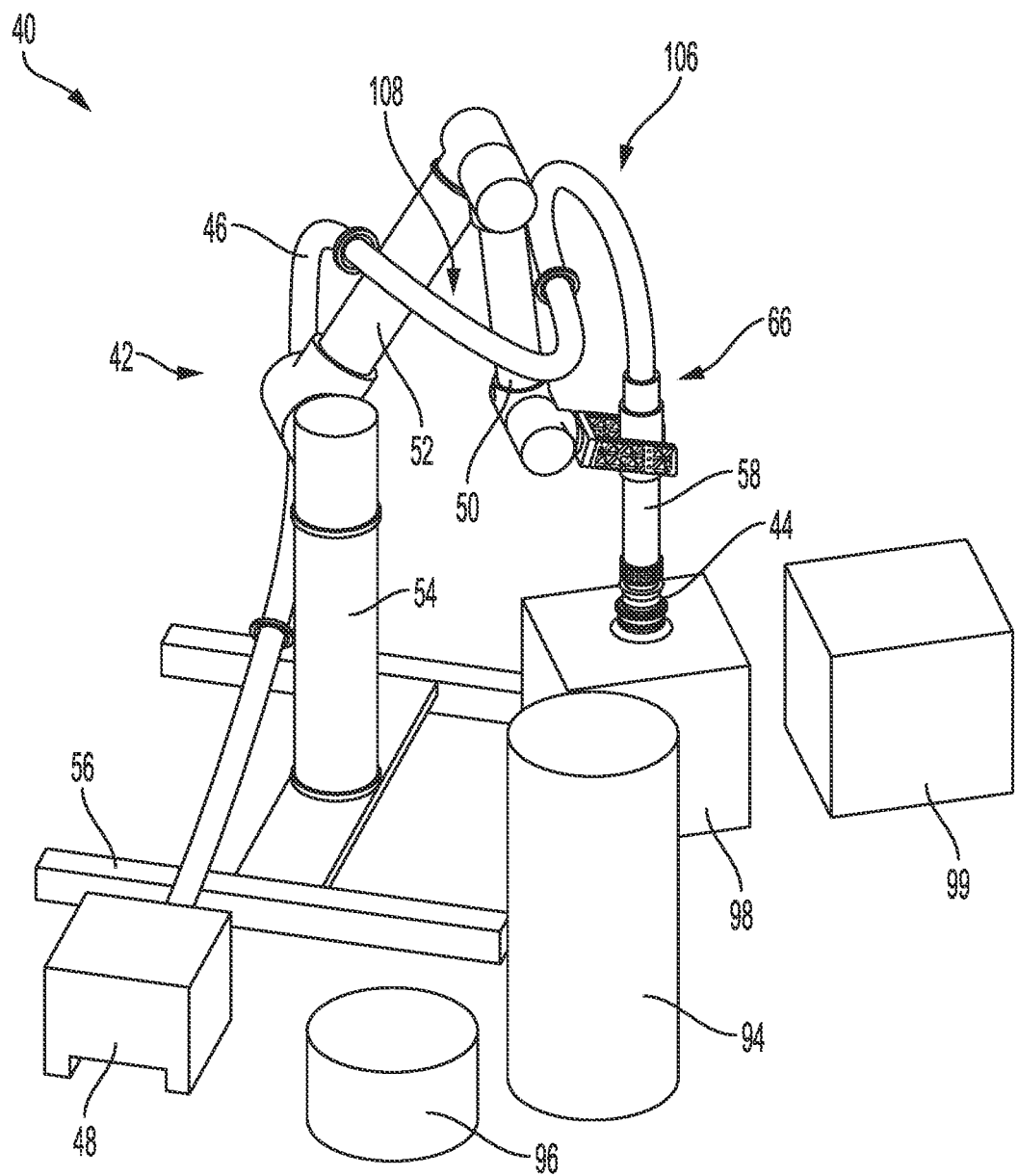

FIGS. 10A and 10B show alternate views of the system 40 as shown in FIGS. 9A and 9B. As shown in FIG. 10A, the hose remains fairly free of stress and build-up of potential energy when the end effector 44 is accessing the object 99, but when the end effector 44 accesses the lower and close-by object 98, the sections 106, 108 may bend too much. Again, such actions repeated over time will decrease the life of the high flow vacuum hose, and permitting the hose to move through the couplings reduces the hose fatigue.

As noted above with reference to FIG. 4, the system 40 may also include a first rotational coupling 66 that couples the hose 46 to the end effector section 58, as well as a second rotational coupling 68 that couples the hose 46 to the vacuum source 48. With initial reference to FIG. 11, the rotational couplings 66 (and 68) may each include a collar 120 that may be friction fit (or otherwise adhered) onto the hose end such that an end surface 128 of the hose end abuts against an inner wall 124 and inner ledge 126 within the collar 120. The collar 120 includes one or more sealing rings 130, 132 (e.g., of any of rubber, plastic or metal), as well as an outer surface 134 of a bearing race set. The sealing rings 130, 132 may seat within annular grooves 140, 142 of the end effector section 58, and with further reference to FIG. 12, the outer surface 134 of the bearing race set may friction fit against an inner surface 144 of the end effector section 58. An end surface of the coupling 120 may sit against an inner ledge 146 on the end effector section 58.

Figure 12:
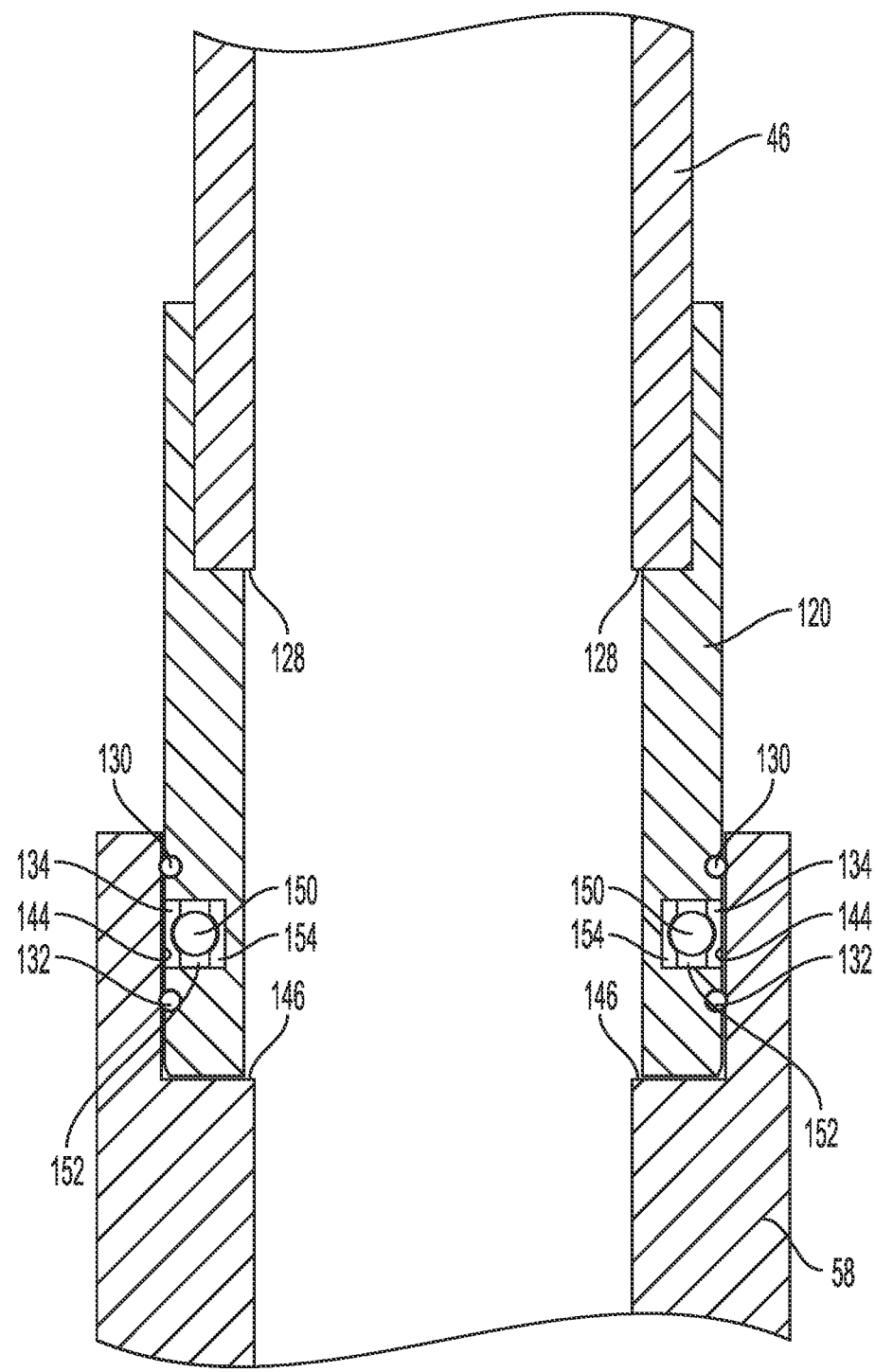
FIG. 12 shows an illustrative diagrammatic sectional view of the rotational coupling of FIG. 11.
Figure 13:
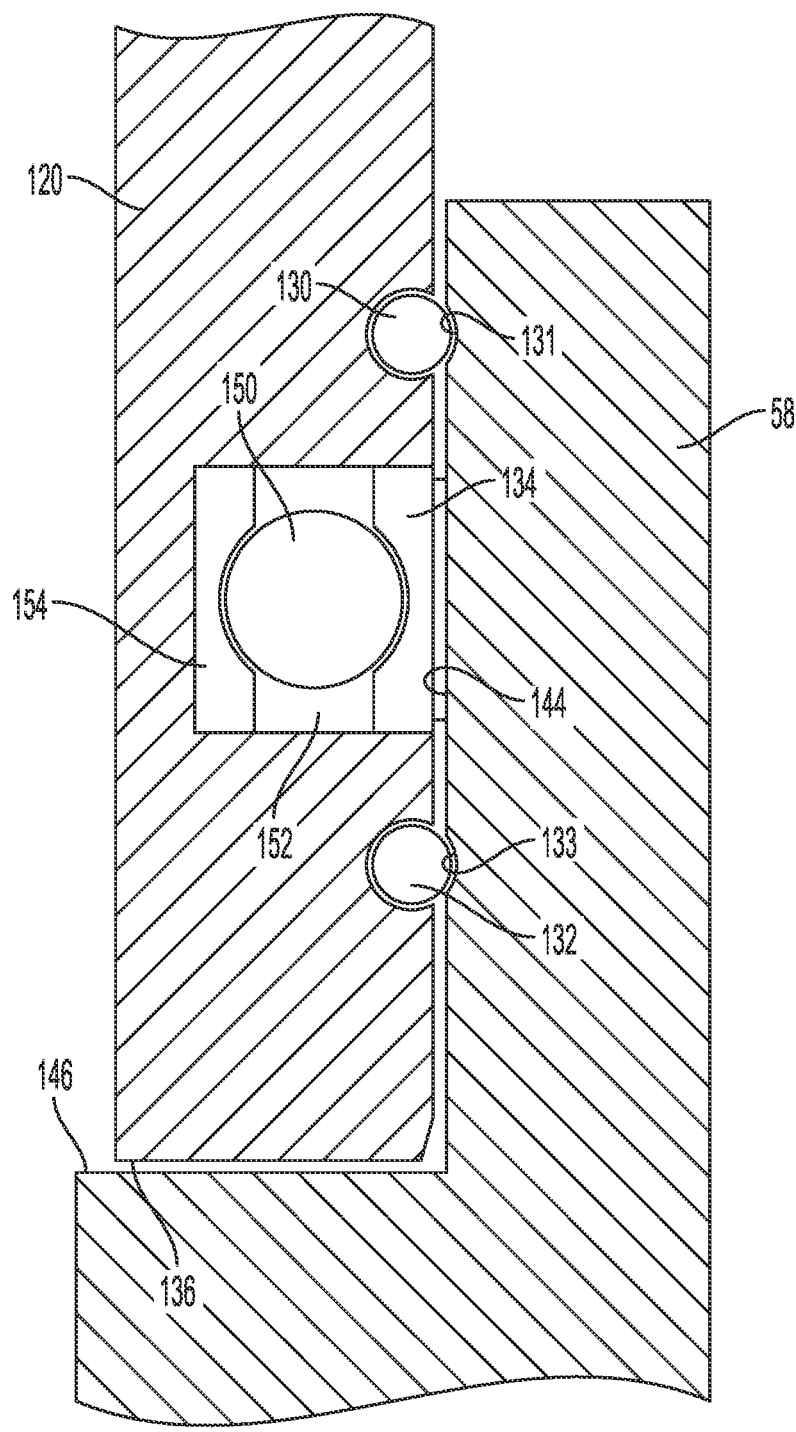
FIG. 13 shows an illustrative diagrammatic enlarged view of a portion of the sectional view of the rotational coupling shown in FIG. 12.

FIG. 12 shows a partial sectional view of the rotational coupling that shows the bearing race set including the outer surface 134, as well as bearing balls 150 within a bearing cavity 152, and an inner surface 154 that is attached to the coupling 120. With reference to FIG. 13, when the coupling 120 is inserted into the end effector section 58, the sealing rings 130, 132 ride along an inner surface 144 of the end effector section 58 until they seat into grooves 131, 133. When this happens, the outer surface 134 of the coupling 120 engages the inner surface 144 of the end effector section 58.

The rotational coupling 68 attaches an opposite end of the hose 48 to the vacuum source 48 in the same fashion as that of rotational coupling 67 attaching the hose 48 to the end effector section 58. The rotational couplings 66, 68 further facilitate the release of any stress on the hose 46 as the articulated arm 42 moves about in its environment.

As discussed above, even with the pass-through couplings and rotational couplings, in certain aspects it is further provided that the control system processor 100 may identify one or more restricted areas 160 that, although the end effector 44 may be able to reach objects in the restricted area(s) 160, doing so would present unwanted forces on the high flow vacuum hose as discussed above. For example, as shown in FIG. 14A and with reference to FIGS. 7A, 7B, 8A and 8B, it may be seen that although the top of the object 94 is not within the restricted area 160, the object 96 is within the restricted area. As discussed with regard to FIGS. 7B and 8B, accessing the object 96 is considered to impose too much stress and/or forces on the high flow vacuum hose 46. As shown in the view of FIG. 14B, and with reference to FIGS. 9A, 9B, 10A and 10B, although the top of the object 99 is not within the restricted area 160, the object 98 is within the restricted area. As discussed with regard to FIGS. 9B and 10B, accessing the object 98 is considered to impose too much stress and/or forces on the high flow vacuum hose 46.

Figure 15:
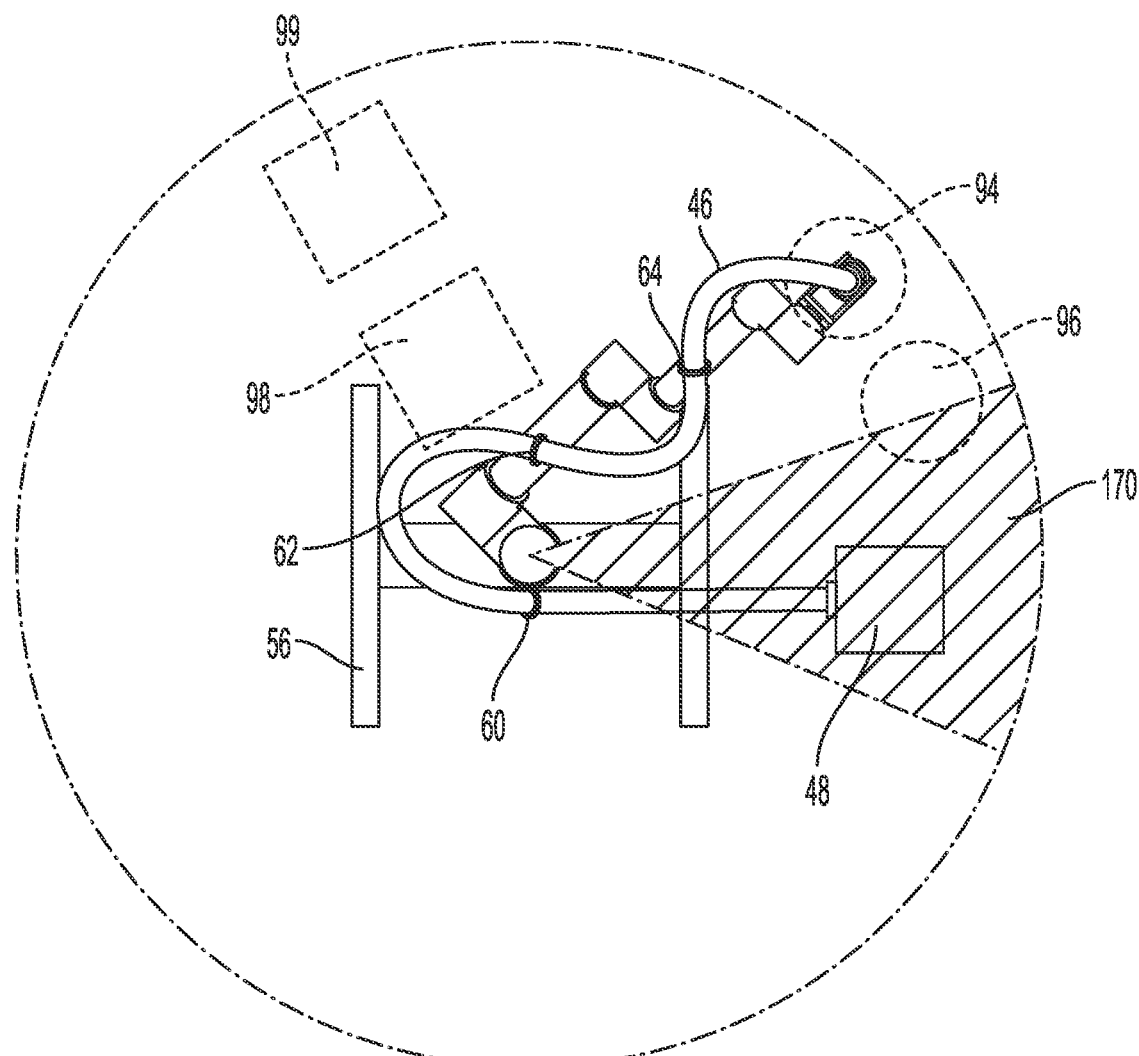
FIG. 15 shows an illustrative diagrammatic top view of the articulated arm system of FIGS. 14A and 14B.
Figure 16:
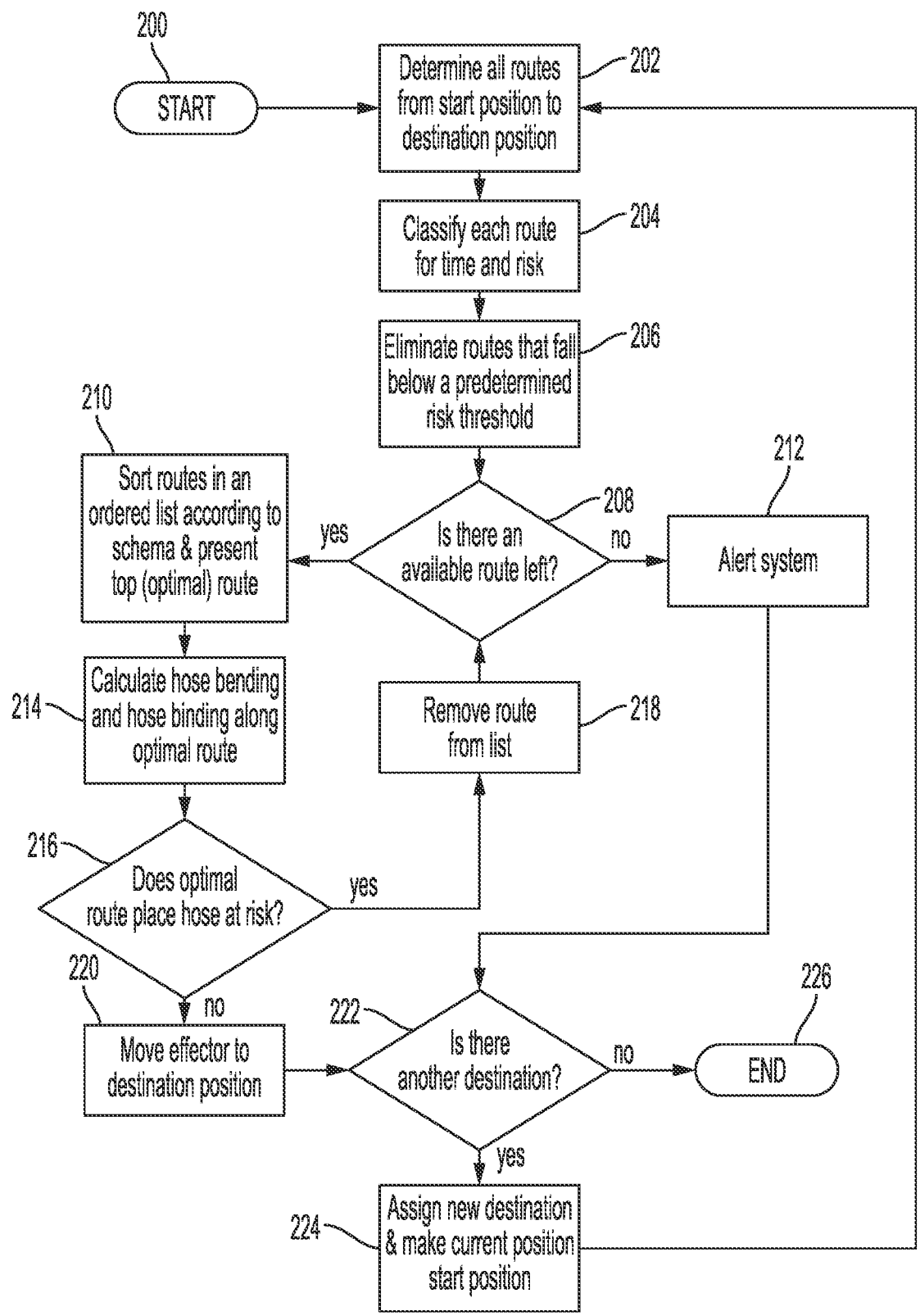
FIG. 16 shows an illustrative diagrammatic flowchart of processing steps in an articulated arm system in accordance with an aspect of the present invention.

In accordance with further aspects and with reference to the plan view in FIG. 15, for each current position of the articulated arm 42, the system may additionally identify one or more restricted areas 170 that are not desired areas for the end effector 44 to reach given the use of the high flow vacuum hose even though the articulated arm may readily be able to position the end effector within the one or more restricted areas 170. In particular, for each stopped position of the articulated arm prior to a move, the system may determine a desired or optimal route to a current destination (e.g., either to move toward a new object or to bring a current object to its destination location). Such restricted area(s) 170 include areas in which, were the end effector to move into them, would cause the high flow vacuum hose to undergo unwanted stress or forces on the hose, reducing the life of the hose.

The process, for example, may involve a dynamic process of determining whether a planned path from any current position would impart too much force (e.g., stress, strain, bending, torsion or compression). The process may start (step 200) by determining all routes from a start position to a planned destination position (step 202). Each route is then classified (step 204), e.g., in terms of time and risk), and routes that fall below a predetermined threshold for time or risk are eliminated (step 206). The process then determines (step 208) whether an acceptable route is available, and if so (step 210) the system then sorts the routes into an ordered list according to any of a variety of schema (e.g., shortest time, shortest risk and combinations thereof), and a present (optimal) route is chosen. If no available route remains (step 208), then the system sends a system alert (step 212) and will determine whether a further destination is available (step 222).

If an acceptable route is available (step 210), the system then, for the proposed route determines the amount of hose bending, hose torsion, and any hose binding that is expected to occur along the proposed route (step 214). In accordance with various aspects, this may be done by digitally modeling the hose movement during movement of the articulated arm. In further aspects, the system may determine how much each joint would be required to bend or rotate, and if the bend or movement of arm sections about any joint is too restrictive, the system may determine that to hose would be placed under too much stress (bending, torsion or binding). If the amount of hose bending, hose torsion, and any hose binding that is expected to occur along the proposed route (for example, determined hose stress data for the proposed route) is determined to be too high (step 216), the system will remove the route from the list (step 218) and return to step 208 and determine again whether any route is left available for the destination position. If the amount of hose bending, hose torsion, and any hose binding that is expected to occur along the proposed route is not determined to be too high (step 216), the system will move the end effector to the destination position (step 220).

After the end effector is moved to the destination position, the system will determine whether a new move to a new destination (step 222), and if not, the process ends (step 226). If a further destination position is required (step 222), the system will assign the new destination position and will substitute the position of the end effector to be the current position (step 224), and will return to step 202 and determine all routes from the current position to the new destination position.

If objects remain in the environment but no new destination position is available, the system may request help from human personnel. The system, for example, may include the communication device 110 (shown in FIG. 4) that includes the display 112 for displaying information regarding any movement of objects that needs to be performed, as well as the re-set button 114 that a person may depress when finished executing the instructions. The system would then begin again from the current position.

Figure 17A:
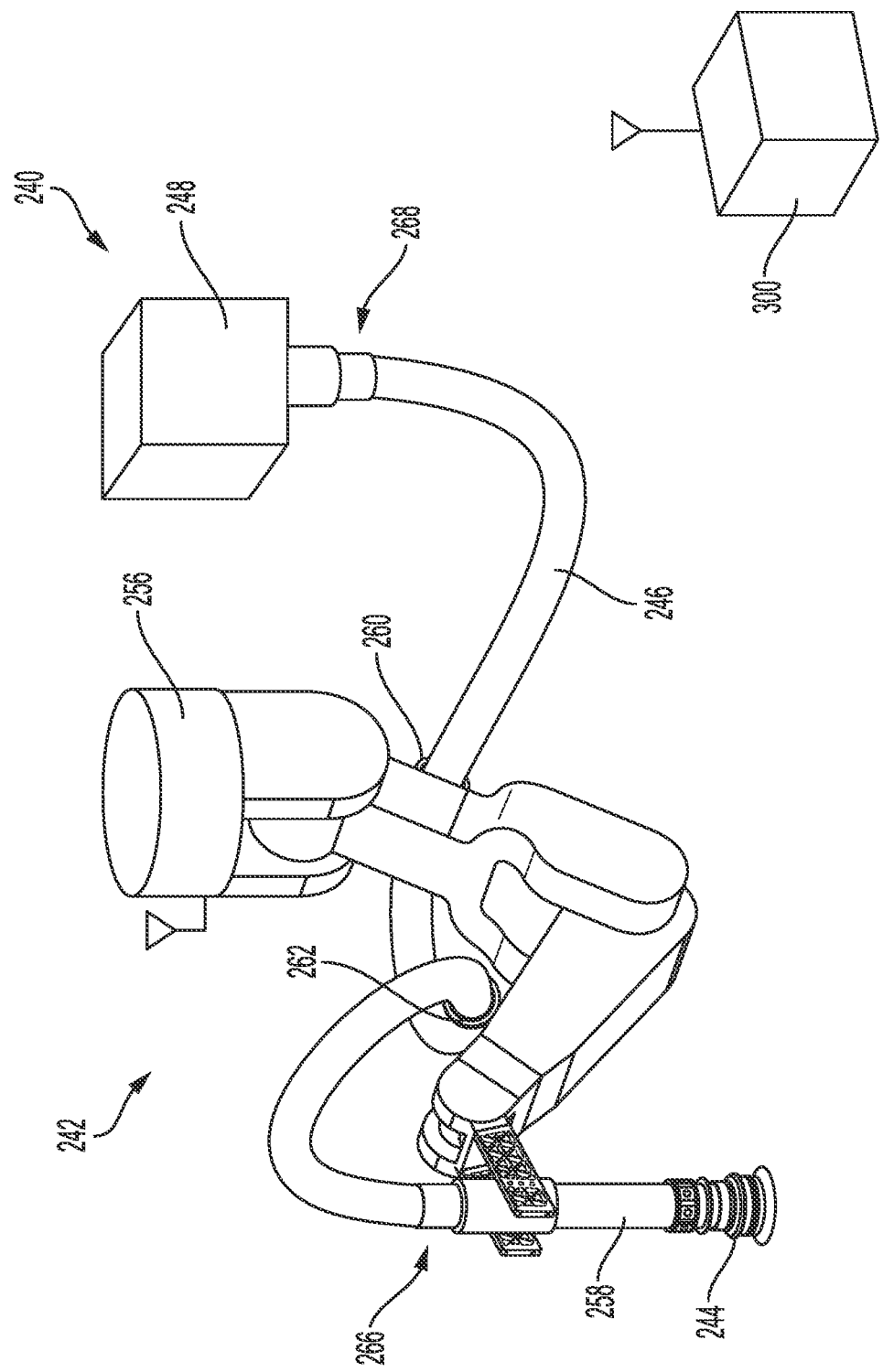
FIGS. 17A and 17B show illustrative diagrammatic views of an articulated arm system in accordance with a further aspect of the present invention that includes a robot base that is suspended from an above position.
Figure 17B:
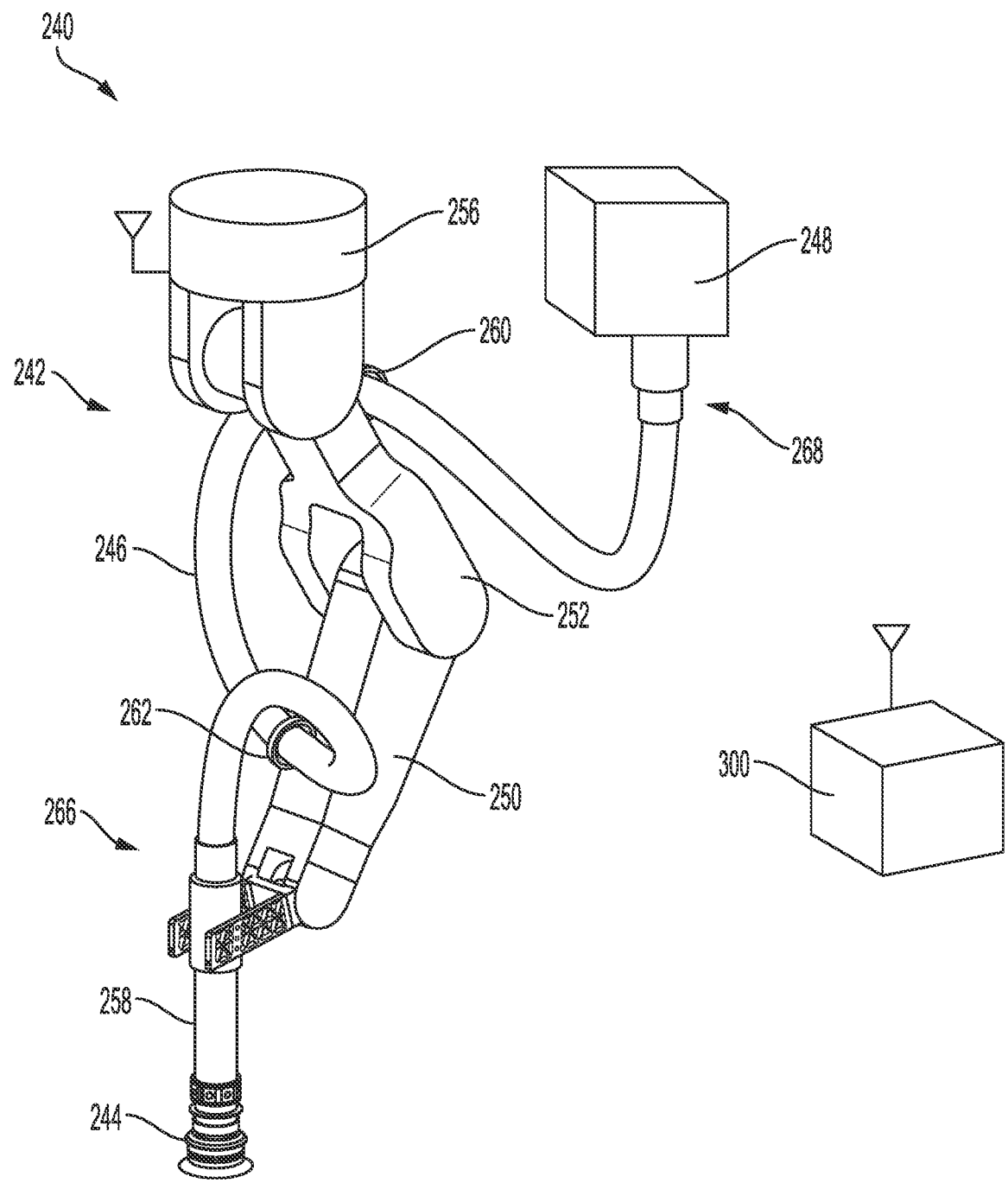

With reference to FIGS. 17A and 17B, in accordance with a further aspects, the invention provides a system 240 that includes a programmable motion device such as an articulated arm 242 that includes an end effector 244, such as a flexible bellows, that is coupled via a vacuum hose 246 to a vacuum source 248. The articulated arm may be mounted at its base 256 to a high position such that the articulated arm may operate in an environment below the base 256. Again, and in accordance with various embodiments, the vacuum at the end effector may have a flow rate of at least 100 cubic feet per minute, and a vacuum pressure of no more than 65,000 Pascals below atmospheric (e.g., about 50 Pascals below atmospheric or 7.25 psi). The hose may have an inner diameter of at least 1 inch, e.g., 2 inches, (or at least 3 inches), and may include a helical ribbing as discussed above.

The articulated arm 242 includes arm sections 250, 252, as well as a base 256 and an end effector section 258 to which the end effector 244 is attached. In accordance with certain embodiments of the invention, the vacuum hose 246 is coupled to certain hose sections by pass-through couplings 260, 262. Significantly, the pass-through couplings 260, 262 permit the vacuum hose 246 to move freely through the couplings as the articulated arm 242 is moved. Further, each pass-through coupling may also be mounted to a respective arm section such that the pass-through coupling may pivot with respect to the respective arm section as discussed above. The system 240 may also include a first rotational coupling 266 that couples the hose 246 to the end effector section 258, as well as a second rotational coupling 268 that couples the hose 246 to the vacuum source 248 as discussed above. Movement of the articulated arm may be controlled by one or more processing systems 300 that communicate (e.g., via wired or wireless communication) with the articulated arm, any cameras in the robotic environment, and the communication device 110. The system 240 may operate as discussed above with the previously discussed systems, and in particular, may evaluate different positions of the articulated arm 242 to determine whether any destination positions will cause too much stress (e.g., bending, torsion or binding) on the high flow vacuum hose.

Hose routing approaches of various aspects of the invention allow for a chain of such kinds of attachments and hose segments to be provided that would exploit pass-through couplings for a multi-link robot, with the objective of minimizing the maximum bending energy, and reduce the amount of cyclic loading to which the hose would be subjected.

Those skilled in the art will appreciate that numerous modifications and variations may be made to the above disclosed embodiments without departing from the spirit and scope of the present invention.

What is claimed is:

1. A programmable motion robotic system comprising:
   a plurality of arm sections that are joined one to another at a plurality of joints to form an articulated arm; and
   a hose coupling an end effector of the programmable motion robotic system to a vacuum source;
   a pass-through coupling, said hose being attached to at least one arm section of the articulated arm by the pass-through coupling that permits the hose to pass freely through the coupling as the plurality of arm sections are moved about the plurality of joints; and
   a control system processor that identifies one or more restricted areas of movement of the articulated arm based on a movement model of the hose to prevent unwanted forces on the hose, wherein the unwanted forces includes any of a stress, a strain, a bending, a torsion, and a compression on the hose.

2. The programmable motion robotic system as claimed in claim 1, wherein the pass-through coupling is rotatable with respect to the at least one arm section to which the pass-through coupling is attached.

3. The programmable motion robotic system as claimed in claim 1, wherein the pass-through coupling includes rollers.

4. The programmable motion robotic system as claimed in claim 1, wherein the vacuum source provides, via the hose, a vacuum at the end effector having a flow rate of at least 100 cubic feet per minute.

5. The programmable motion robotic system as claimed in claim 1, wherein the vacuum source provides, via the hose, a vacuum at the end effector having a vacuum pressure of no more than 65,000 Pascals below atmospheric.

6. The programmable motion robotic system as claimed in claim 1, wherein the hose has an inner diameter of at least 1 inch.

7. The programmable motion robotic system as claimed in claim 1, wherein the hose has an inner diameter of 2 inches.

8. The programmable motion robotic system as claimed in claim 1, wherein the hose has a helical ribbing.

9. The programmable motion robotic system as claimed in any of the preceding claims, wherein the programmable motion robotic system further includes a ring collar to which the hose is attached, said ring collar permitting free rotational movement of the hose with respect to the collar.

10. The programmable motion robotic system as claimed in claim 1, wherein the end effector includes a flexible bellows.

11. A programmable motion robotic system comprising:
    a plurality of arm sections that are joined one to another at a plurality of joints to form an articulated arm; and
    a hose coupling an end effector of the programmable motion robotic system to a vacuum source;
    a pass-through coupling, said hose being attached, in a joint portion of the hose, to at least two arm sections with a joint between the at least two arm sections, such that the hose is coupled to one arm section of the at least two arm sections by the pass-through coupling that permits the hose to pass freely through the coupling when the one arm section is rotated about the joint with respect to another arm section of the at least two arm sections; and a control system processor that determines a plurality of possible routes for moving the articulated arm from a first position to a second position, models a stress on the hose associated with each route, and moves the articulated arm from the first position to the second position along a selected route from among the plurality of possible routes, wherein the modeled stress on the hose for the selected route is less than a predetermined threshold.

12. The programmable motion robotic system as claimed in claim 11, wherein the pass-through coupling is rotatable with respect to an arm section to which the pass-through coupling is attached.

13. The programmable motion robotic system as claimed in claim 11, wherein the pass-thorough coupling includes rollers.

14. The programmable motion robotic system as claimed in claim 11, wherein the vacuum source provides, via the hose, a vacuum at the end effector having a flow rate of at least 100 cubic feet per minute.

15. The programmable motion robotic system as claimed in claim 11, wherein the vacuum source provides, via the hose, a vacuum at the end effector having a vacuum pressure of no more than 65,000 Pascals below atmospheric.

16. The programmable motion robotic system as claimed in claim 11, wherein the hose has an inner diameter of at least 1 inch.

17. The programmable motion robotic system as claimed in claim 11, wherein the hose has an inner diameter of 2 inches.

18. The programmable motion robotic system as claimed in claim 11, wherein the hose has a helical ribbing.

19. The programmable motion robotic system as claimed in claim 11, wherein the hose includes at least three joint portions of the hose, each of which joint portion of the hose is attached to at least two adjacent arm sections mutually attached to a respective joint such that the hose is coupled to each arm section by a pass-through coupling that permits the hose to pass freely through the coupling.

20. The programmable motion robotic system as claimed in claim 11, wherein the hose includes no portions of the hose that is attached to at least two adjacent arm sections mutually attached to a respective joint such that the hose is coupled to an arm section by other than a pass-through coupling that permits the hose to pass freely through the coupling.

21. The programmable motion robotic system as claimed in claim 11, wherein the end effector includes a flexible bellows.

22. A method of minimizing forces on a hose in a programmable motion system that includes an end effector on an articulated arm that is coupled to a vacuum source by the hose, said method comprising:

providing a pass-through coupling on an arm section of the articulated arm;
moving the arm section of the articulated arm;
permitting the hose to move through the pass-through coupling to reduce any of binding or bending of the hose; and
restricting a movement of the articulated arm from a first position to a second position when the movement is determined to potentially cause unwanted forces on the hose, which includes:
modeling an amount of any bending, torsion, and binding of the hose that is expected to occur along a proposed route for moving the end effector of the articulated arm from a first position to a second position;
eliminating the proposed route for moving the end effector of the articulated arm in response to determining that the modeled amount of any bending, torsion, and binding of the hose along the proposed route exceeds a threshold; and
moving the end effector from the first position to the second position along the proposed route in response to determining that the modeled amount of any bending, torsion, and binding of the hose along the proposed route does not exceed the threshold.

23. The method as claimed in claim 22, wherein the method further includes permitting the pass-through coupling to rotate with respect to the arm section to which the pass-through coupling is attached.

24. The method as claimed in claim 22, wherein the pass-through coupling includes rollers.

25. The method as claimed in claim 22, wherein the method further includes providing, via the hose, a vacuum at the end effector having a flow rate of at least 100 cubic feet per minute.

26. The method as claimed in claim 22, wherein the method further includes providing, via the hose, a vacuum at the end effector having a vacuum pressure of no more than 65,000 Pascals below atmospheric.

27. The method as claimed in claim 22, wherein the hose has an inner diameter of at least 1 inch.

28. The method as claimed in claim 22, wherein the hose has an inner diameter of 2 inches.

29. The method as claimed in claim 22, wherein the hose has a helical ribbing.

30. The method as claimed in claim 22, wherein the method further includes permitting the hose to move with respect to a ring collar to which the hose is attached.

31. The method as claimed in claim 22, wherein the proposed route is selected from among a plurality of optional routes.

32. The method as claimed in claim 22, wherein the end effector includes a flexible bellows.

* * * * *